(12) United States Patent
Sakai et al.

(10) Patent No.: US 10,274,720 B1
(45) Date of Patent: Apr. 30, 2019

(54) PIXEL DESIGN FOR REDUCED LIGHT LEAKAGE

(71) Applicant: AMAZON TECHNOLOGIES, INC., Seattle, WA (US)

(72) Inventors: Toru Sakai, Waalre (NL); Tulasi Sridhar Reddy Guntaka, Eindhoven (NL); Karel Johannes Gerhardus Hinnen, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 15/259,546

(22) Filed: Sep. 8, 2016

(51) Int. Cl.
*G02B 26/00* (2006.01)
*G09G 3/34* (2006.01)
*G02B 5/00* (2006.01)

(52) U.S. Cl.
CPC ............ *G02B 26/005* (2013.01); *G02B 5/003* (2013.01); *G09G 3/348* (2013.01); *G09G 2300/0809* (2013.01)

(58) Field of Classification Search
CPC .................................................... G02B 26/005

USPC .......................................................... 359/290
See application file for complete search history.

(56) References Cited

U.S. PATENT DOCUMENTS

2013/0271816 A1* 10/2013 Shim .................... G02B 26/005
                                                              359/290

* cited by examiner

*Primary Examiner* — James C. Jones
(74) *Attorney, Agent, or Firm* — EIP US LLP

(57) ABSTRACT

A display device includes a first support plate and an opposing second support plate. A first pixel region between the first support plate and the second support plate includes a first thin film transistor (TFT) structure over the first support plate. A second pixel region between the first support plate and the second support plate and adjacent the first pixel region includes a second TFT structure over the first support plate. A first pixel wall portion is positioned over the first support plate between the first pixel region and the second pixel region such that each of the first TFT structure and the second TFT structure is positioned adjacent the first pixel wall portion. A light-blocking portion is disposed on an inner surface of the second support plate and positioned over the first TFT structure and the second TFT structure.

20 Claims, 8 Drawing Sheets

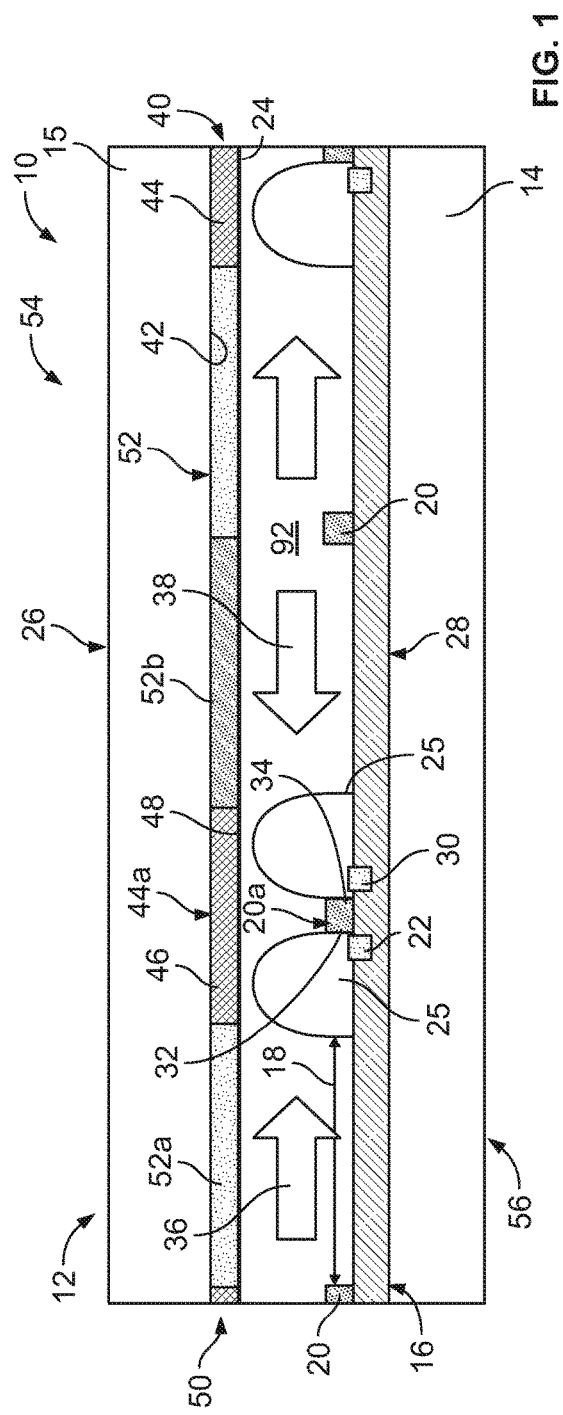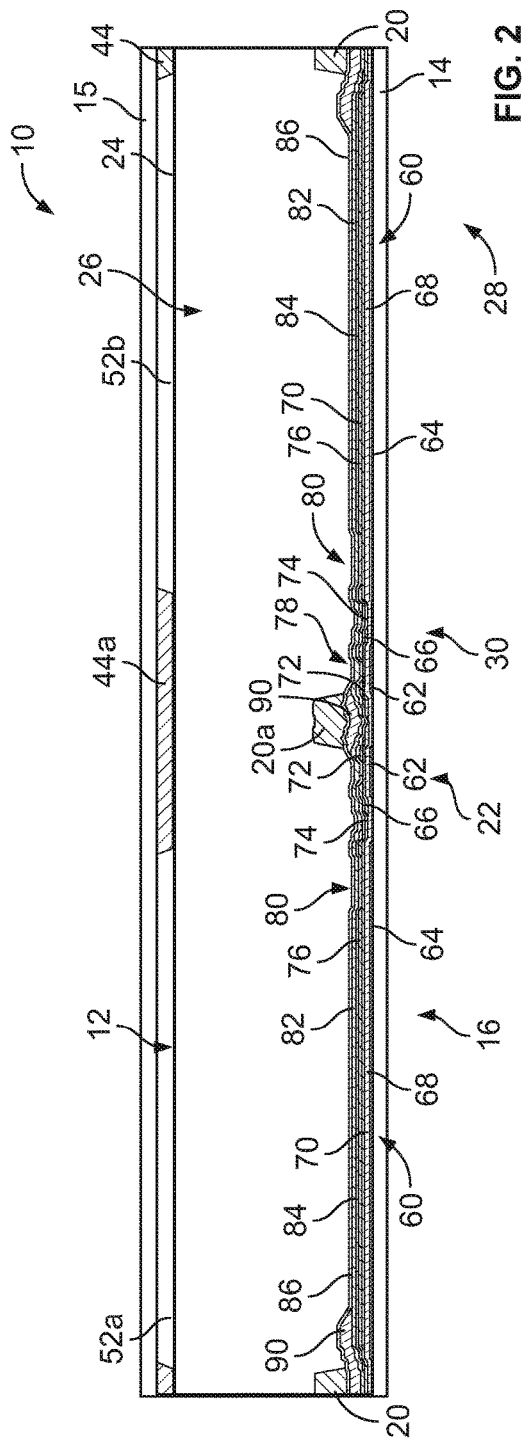

PIXEL DESIGN FOR REDUCED LIGHT LEAKAGE

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

At least some electronic display devices include a thin film transistor (TFT) structure having photosensitive electric components or layers. When light enters the display device, the light may propagate into the TFT structure and impinge on these electric components or layers, potentially causing the components to operate improperly and/or damaging the components.

BRIEF DESCRIPTION OF THE DRAWINGS

The detailed description is set forth with reference to the accompanying figures. The use of the same reference numbers in different figures indicates similar or identical items or features.

FIG. 1 is a cross-sectional view of adjacent electrowetting pixel regions of an example electrowetting display device, according to various embodiments;

FIG. 2 is a schematic cross-sectional view of adjacent electrowetting pixel regions of an example electrowetting display device, according to various embodiments;

DETAILED DESCRIPTION

Figure 3:
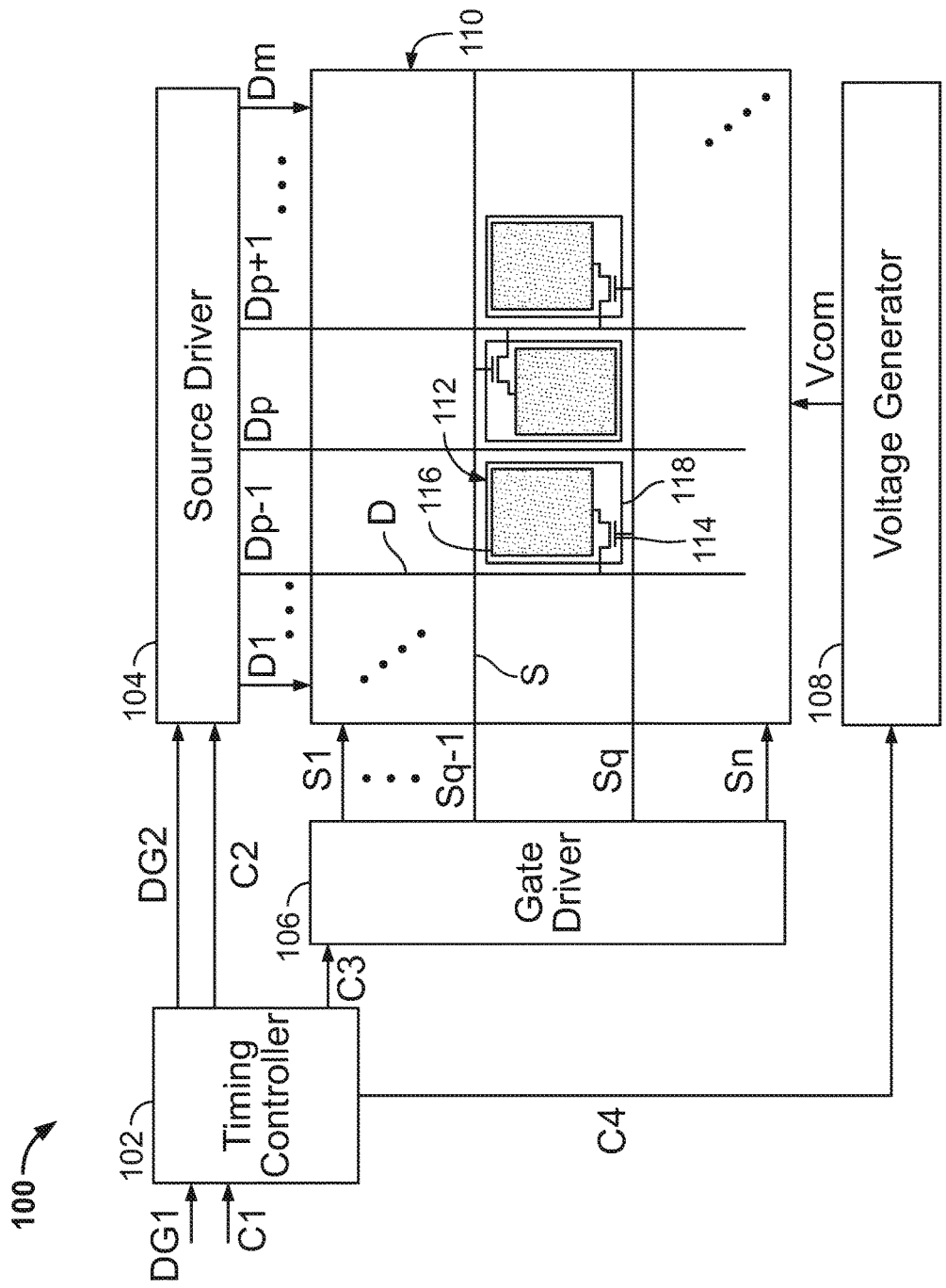
FIG. 3 is a schematic view of an example electrowetting display device, according to various embodiments.

In example embodiments described herein, a light-blocking layer, such as an organic light-absorbing layer, e.g., a black matrix layer, is disposed on a top support plate and includes one or more light-blocking portions. In alternative example embodiments, the light-blocking layer includes a color filter layer disposed on the top support plate having adjacent color filter portions that partially overlap to form a light-blocking portion. More specifically, the light-blocking layer includes a plurality of light-blocking portions on the inner surface of the top support plate. Each light-blocking portion of the plurality of light-blocking portions is positioned over, e.g., aligned with, a pixel wall portion forming at least a portion of a perimeter of an associated electrowetting pixel region. In example embodiments, a first light-blocking portion is positioned over a common pixel wall portion disposed between adjacent pixel regions. The first light-blocking portion extends over the TFT structures of each of the adjacent pixel regions to cover at least a silicon layer of each TFT structure to shield the photosensitive silicon from potentially harmful exposure to light. For example, a first pixel region of the display includes a first TFT structure adjacent a common pixel wall portion partially forming a perimeter of the first pixel region. A second pixel region adjacent the first pixel region, e.g., positioned above or below the first pixel region in a column of pixel regions, includes a second TFT structure adjacent the common pixel wall portion partially forming a perimeter of the second pixel region. In example embodiments, the first light-blocking portion is positioned over the common pixel wall portion and extends over the first TFT structure and the second TFT structure to cover at least a silicon layer of each TFT structure. In certain embodiments, the first light-blocking portion includes a first portion extending along the inner surface of the top support plate over or into the first pixel region over the first TFT structure and a second portion extending along the inner surface of the top support plate over or into the second pixel region over the second TFT structure.

In many electrowetting display devices, a thin film transistor (TFT) structure includes a silicon layer, such as a semiconductor layer including amorphous silicon, which is highly photosensitive. When light passes through the display device, a portion of the light may pass into the TFT structure and impinge on the silicon. When this light leakage occurs, the TFT structure becomes conductive due to the photosensitivity of the silicon. As a result, the TFT structure no longer acts as a reliable switch to activate or deactivate an associated pixel region and leakage current from the TFT structure may cause undesirable crosstalk between adjacent pixel regions, particularly under bright lighting conditions and/or during low frequency driving situations. More specifically, when the TFT structure is operating effectively as a switch, at a positive gate voltage, the TFT structure will activate the associated pixel region. Conversely, at a negative gate voltage, the current through the TFT structure is essentially zero and the TFT structure will deactivate the associated pixel region preventing transmission of signals from an electrode layer, i.e., a gate electrode layer, of the TFT structure to the associated pixel region. However, as the TFT structure becomes conductive as a result of light leakage into the TFT structure, the TFT structure no longer acts as an effective switch to deactivate the associated pixel region and prevent current flow to the associated pixel region. Generally, leakage current refers to a small amount of current that flows or leaks through a transistor, e.g., a TFT structure, when the transistor is turned off. In an ideal transistor, the leakage current is zero, but in practice, leakage current has a finite value. For example, leakage current causes the voltage in the pixel capacitor to either drop or increase between each frame refresh, and, thus, changes the pixel region brightness. Leakage current also affects the fineness of the display's grayscale. With a low leakage current, finer levels of grayscale can be achieved.

In at least some conventional TFT-EWD display panels, mitigating light leakage is difficult because the cell gap, i.e., a distance between a top support plate of the display and an opposing bottom support plate of the display is relatively large, e.g., greater than 20.0 micrometers. In an attempt to mitigate light leakage, at least some conventional displays include a grid of black matrix material on an inner surface of the top support plate that is aligned with a grid of pixel wall portions at least partially defining an array of pixel regions between the top support plate and the bottom support plate. The black matrix material is configured to absorb light entering the display device so that the light does not propagate into the TFT structure; however, because of this relatively large cell gap, the black matrix grid does not prevent all light from entering the TFT structure from sides or edges of the black matrix material grid. Moreover, in certain conventional displays, the black matrix material extends into or over the respective electrowetting pixel region in order to protect the TFT structure from harmful exposure to light, limiting an active area of the electrowetting pixel region through which light is able to propagate into the electrowetting pixel region and, as a result, adversely affecting a brightness of the electrowetting pixel region.

An amount of light undesirably entering the TFT structure can be greatly minimized or eliminated by placing the TFT structures of adjacent pixel regions adjacent a common pixel wall portion such that a light-blocking portion positioned over the common pixel wall portion extends over both TFT structures to absorb light that might otherwise undesirably impinge on the TFT structures. More specifically, the light-blocking portion can be disposed on an inner surface of the top support plate and positioned above the semiconductor layer to prevent or limit light from impinging on a surface of the silicon layer. In certain embodiments, the light-blocking portion has minimum suitable dimensions to extend over or into the respective pixel regions and over at least a portion of the silicon layer not covered by other layers or components of the TFT structure, e.g., a source and a drain of a metal layer disposed on the silicon layer, as described below.

In example embodiments described herein, an electrowetting display device includes a thin film transistor (TFT) structure over a first support plate. The TFT structure includes a first metal layer, including a gate, over the first support plate. A dielectric layer is disposed on the first metal layer and a silicon layer, e.g., a silicon semiconductor layer including an amorphous silicon material, is disposed on the dielectric layer over the gate. A second metal layer including a source and a drain for the TFT structure is disposed over the silicon layer and the dielectric layer. The source and drain are disposed over the silicon layer to cover at least a portion of the silicon layer. A first passivation layer is disposed over the second metal layer and the silicon layer. A contact, such as a contact hole or a piece of conductive material, extends through the first passivation layer. A third metal layer is disposed on the second passivation layer and the second metal layer. The third metal layer is electrically coupled to the drain of the second metal layer through the contact formed through the first passivation layer and forms a reflective layer configured to reflect a portion of light in the electrowetting pixel region. In example embodiments, a suitable dielectric barrier layer is disposed over the third metal layer and a hydrophobic layer is disposed over the dielectric layer. A plurality of pixel wall portions are then disposed over, e.g., formed on, the hydrophobic layer forming a perimeter of one or more respective electrowetting pixel regions. In example embodiments, one or more pixel wall portions are positioned over at least a portion of the TFT structure and, more particularly, over at least a portion of the silicon layer.

Referring now to the figures, FIG. 1 is a schematic cross-sectional view of a portion of an example display device, such as a reflective electrowetting display device 10. FIG. 1 illustrates adjacent electrowetting pixel regions between opposing support plates of the electrowetting display device, e.g., three adjacent electrowetting pixel regions arranged in a column of a plurality of electrowetting pixel regions. FIG. 2 is cross-sectional view of two adjacent electrowetting pixel regions between opposing support plates of the electrowetting display device, e.g., a first pixel region and an adjacent second pixel region arranged in a column of a plurality of pixel regions, separated by a common pixel wall portion. Referring further to FIG. 1, a first pixel region, such as a first electrowetting pixel region 12, is arranged in a first column of a plurality of pixel regions. First electrowetting pixel region 12 is positioned over a first or bottom support plate 14, e.g., positioned between bottom support plate 14 and a second or top support plate 15 opposing bottom support plate 14. In example embodiments, first electrowetting pixel region 12 includes an electrowetting sub-pixel 16 formed over bottom support plate 14 to define a display surface area 18, as shown in FIG. 1. A plurality of pixel wall portions 20 is formed over first support plate 14 to form a perimeter of first electrowetting pixel region 12. In certain embodiments, a pixel region may include a pixel, a sub-pixel, or a pixel having two or more sub-pixels of a display device. Such pixels or sub-pixels may be the smallest light transmissive, reflective or transflective unit of a display that is individually operable to directly control an amount of light transmission through or reflection from the pixel region. For example, in some embodiments, a pixel region may include a red sub-pixel, a green sub-pixel, a blue sub-pixel, or a white sub-pixel for RGBW displays. In other embodiments, a pixel may be a smallest component, e.g., the pixel does not include any sub-pixels.

Reflective electrowetting display device 10 includes a first thin film transistor (TFT) structure 22 disposed over, e.g., formed on, first support plate 14 and associated with, e.g., operatively coupled to, first electrowetting pixel region 12. In example embodiments, first TFT structure 22 is positioned in first electrowetting pixel region 12 and operatively coupled to a common electrode 24 positioned under top support plate 15 for creating, in conjunction with common electrode 24, a voltage differential between first TFT structure 22 and common electrode 24 to cause displacement of a first fluid 25, e.g., a liquid such as an opaque electrowetting oil, in first electrowetting sub-pixel 16.

Also shown in FIG. 1 is a second pixel region, such as a second electrowetting pixel region 26, arranged in the first column of a plurality of pixel regions adjacent first electrowetting pixel region 12, for example, below or above first electrowetting pixel region 12. Second electrowetting pixel region 26 is positioned over bottom support plate 14, e.g., positioned between bottom support plate 14 and top support plate 15 opposing bottom support plate 14. In example embodiments, second electrowetting pixel region 26 includes an electrowetting sub-pixel 28 formed over bottom support plate 14 to define display surface area 18. A plurality of pixel wall portions 20 is formed over first support plate 14 to form a perimeter of second electrowetting pixel region 26. As shown in FIG. 1, first electrowetting pixel region 12 is a red sub-pixel and second electrowetting pixel region 26 is a blue sub-pixel; although in alternative embodiments, each of first electrowetting pixel region 12 and second electrowetting pixel region 26 may be a sub-pixel of another suitable color.

A second thin film transistor (TFT) structure 30 is disposed over, e.g., formed on, first support plate 14 and associated with, e.g., operatively coupled to, second electrowetting pixel region 26. In example embodiments, second TFT structure 30 is positioned in second electrowetting pixel region 26 and operatively coupled to common electrode 24 for creating, in conjunction with common electrode 24, a voltage differential between second TFT structure 30 and common electrode 24 to cause displacement of first fluid 25 in second electrowetting sub-pixel 28. In example embodiments, first TFT structure 22 and second TFT structure 30 are positioned adjacent a common pixel wall portion, i.e., a first pixel wall portion 20a partially forming the perimeter of first electrowetting pixel region 12 and partially forming the perimeter of second electrowetting pixel region 26. For example, as shown in FIG. 1, first TFT structure 22 is disposed adjacent a first side 32 of first pixel wall portion 20a and second TFT structure 30 is disposed adjacent a second side 34 of first pixel wall portion 20a opposite first side 32. With first electrowetting pixel region 12 activated as described below, first fluid 25 in first electrowetting sub-pixel 16 moves in a first direction 36 toward first TFT structure 22 positioned adjacent first pixel wall portion 20a and, with second electrowetting pixel region 26 activated, first fluid 25 in second sub-pixel 28 moves in a second direction 38 opposite first direction 36 toward second TFT structure 30 positioned adjacent first pixel wall portion 20a.

In example embodiments, a light-blocking layer 40, e.g., a light-absorbing layer, is disposed on top support plate 15. For example, in certain embodiments, light-blocking layer 40 is disposed on an inner surface 42 of top support plate 15. Light-blocking layer 40 includes a plurality of light-blocking portions 44, such as a plurality of light-absorbing portions, for example, disposed on, e.g., deposited or formed on, inner surface 42 of top support plate 15. In certain embodiments, light-blocking portions 44 are coupled to form a grid of light-blocking portions 44 on inner surface 42 of top support plate 15. In these embodiments, the light-blocking portion (or the light-blocking portions) positioned over the respective TFT structure(s) may have a width greater than a width of the remaining light-blocking portions associated with a respective pixel region.

As shown in FIG. 1, a first light-blocking portion 44a is positioned over first pixel wall region 20a. First light-blocking portion 44a extends over first TFT structure 22 to prevent or limit light from propagating through first electrowetting pixel region 12 and/or first pixel wall portion 20a to impinge on first TFT structure 22. First light-blocking portion 44a also extends over second TFT structure 30 to prevent or limit light from propagating through second electrowetting pixel region 26 and/or first pixel wall portion 20a to impinge on second TFT structure 30. In a particular embodiment, a first portion 46 of first light-blocking portion 44a extends over or into first electrowetting pixel region 12 (in a plane of light-blocking layer 40 parallel to inner surface 42 of top support plate 15) to cover first TFT structure 22. Similarly, a second portion 48 of first light-blocking portion 44a extends over or into second electrowetting pixel region 26 (in the plane of light-blocking layer 40 parallel to inner surface 42 of top support plate 15) to cover second TFT structure 30.

In example embodiments, electrowetting display device 10 includes one or more color filter layers 50 disposed on inner surface 42 of top support plate 15 and coplanar with light-blocking layer 40. As shown in FIG. 1, light-blocking layer 40 and color filter layer 50 are positioned between common electrode 24 and top support plate 15. Color filter layer 50 is disposed on, e.g., formed or deposited on, inner surface 42 of top support plate 15 using a suitable method. Color filter layer 50 includes a plurality of color filter portions, collectively referred to as color filter portions 52. In example embodiments, color filter layer 50 includes a first (red) color filter portion 52a in first electrowetting pixel region 12 and a second (blue) color filter portion 52b in second electrowetting pixel region 26 as shown in FIG. 1. In example embodiments, color filter layer 50 includes a green color filter portion 50c and a transparent (white) color filter portion 52d positioned between common electrode 24 and top support plate 15 and arranged in respective electrowetting pixel regions of a second column of a plurality of electrowetting pixel regions adjacent the first column of electrowetting pixel regions shown in FIG. 1. In example embodiments, each color filter portion 52 is positioned in a respective pixel region. Each color filter portion 52 may be configured to be substantially transparent to particular ranges of wavelengths of light, while absorbing others. For example, red color filter portion 52a may be transparent to red light having wavelengths ranging from 620 nanometers (nm) to 750 nm, while absorbing light having other wavelengths. Blue color filter portion 52b may be transparent to blue light having wavelengths ranging from 450 nm to 495 nm, while absorbing light having other wavelengths. Green color filter portion 52c may be transparent to green light having wavelengths ranging from 495 nm to 570 nm, while absorbing light having other wavelengths. Transparent (white) color filter portion 52d may be transparent to all wavelengths of visible light, namely white light. As used herein, visible light refers to wavelengths of electromagnetic radiation visible to the human eye. Generally, this includes electromagnetic radiation having wavelengths between about 400 nm to about 800 nm.

Color filter portions 52, therefore, may be utilized to assign each electrowetting pixel region, e.g., each electrowetting sub-pixel, a color, so that when a particular electrowetting sub-pixel is in an open state, light reflected by that electrowetting sub-pixel will take on the color of the color filter portion associated with that electrowetting sub-pixel. In other embodiments, different ranges of light wavelengths may be associated with the red color filter portion, the green color filter portion, and the blue color filter portion. In still other embodiments, color filter portions 52 may be configured to block or transmit electromagnetic radiation of different wavelengths entirely. For example, electrowetting display device 10 may be configured to generate images using electrowetting sub-pixels having color filter portions 52 configured to transmit electromagnetic radiation of the colors cyan, magenta, and yellow. In short, color filter portions 52 may be developed and utilized within electrowetting display device 10 in accordance with any display color model.

Color filter portions 52 may be constructed with a generally transparent material such as a photoresist material or photo-definable polymer, including electromagnetic radiation filtering materials suspended within the material. Color filter portions 52 may be formed by the addition of pigments or dyes to a clear photo-definable polymer, for example. The amount of additive depends on system requirements, such as absorbance or transmission specifications. In some cases, polyacrylates are used as photoresist material. General, the organic dyes and pigments used within color filter portions 52 can have molecular structures containing chromophoric groups generating the color filtering properties. Some examples for chromophoric groups are azo-, anthraquinone-, methine- and phtalocyanine-groups. Color filter portions 52 may also be formed using a dichromated gelatin doped with a photosynthesizer, dyed polyimides, resins, and the like.

In a particular embodiment, color filter portions 52 are configured to overlay each electrowetting sub-pixel so that each color filter portion 52 extends from one pixel wall portion 20 on a first side of the electrowetting sub-pixel to an opposing pixel wall portion 20 on a second side of the electrowetting sub-pixel. In one embodiment, electrowetting display device 10 includes a combination of red, blue, green, and white color filter portions 52, with one color filter portion 52 being positioned over each electrowetting sub-pixel. Using color filter portions 52, each electrowetting sub-pixel in electrowetting display device 10 can be associated with a particular wavelength of electromagnetic radiation. By controlling which electrowetting sub-pixels are active within electrowetting display device 10, electrowetting display device 10 can generate color images viewable by a user.

In example embodiments, light-blocking layer 40 includes one or more light-blocking portions 44, e.g., a black matrix material that, in certain embodiments, is light-absorbing, such as a suitable photoresist material, disposed and positioned around at least a portion of each color filter portion 52 to form a perimeter around at least a portion of the associated color filter portion 52. In example embodiments, the black matrix material is aligned with or positioned directly over pixel wall portions 20. More specifically, a plurality of light-blocking portions 44 are aligned over the plurality of pixel wall portions 20 and form a grid on inner surface 42. For example, in certain embodiments, each light-blocking portion 44 is aligned over a respective pixel wall portion 20 of the plurality of pixel wall portions 20. As shown in FIG. 1, electrowetting display device 10 includes first light-blocking portion 44a positioned over first pixel wall portion 20a. More specifically, first light-blocking portion 44a is positioned along an edge of red color filter portion 52a, between red color filter portion 52a and adjacent blue color filter portion 52b. Color filter portions 52 are adjacent when they are next to one another in the display device with no intervening color filter portion 52. Light-blocking portion 44a is formed between red color filter portion 52a and blue color filter portion 52b such that light-blocking portion 44a is between the adjacent red color filter portion 52a and blue color filter portion 52b. In a particular embodiment, light-blocking portion 44a has a width between red color filter portion 52a and blue color filter portion 52b of 16.0 micrometers to 30.0 micrometers, and, more particularly, a width of 25.0 micrometers to 30.0 micrometers. In example embodiments, each color filter portion 52 is disposed over or in a respective electrowetting pixel region between light-blocking portions 44 such that light-blocking portions 44 form a perimeter of each color filter portion 52.

In one alternative embodiment, light-blocking portions 44 are not formed of a light-blocking black matrix material, for example, but, rather, adjacent color filter portions partially overlap to form light-blocking portions 44. More specifically, in this alternative embodiment, color filter layer 50 is disposed on inner surface 42 of top support plate 15. A first color filter portion, e.g., first color filter portion 52a, associated with the first pixel region, e.g., first pixel region 12, includes a first segment positioned over the common pixel wall portion, e.g., first pixel wall portion 20a. A second color filter portion, e.g., second color filter portion 52b, associated with the second pixel region, e.g., second pixel region 26, includes a second segment disposed on the first segment of first color filter portion 52a to form the light-blocking portion, e.g., first light-blocking portion 44a.

Reflective electrowetting display device 10 has a viewing side 54 corresponding to top support plate 15 through which an image formed by reflective electrowetting display device 10 may be viewed, and an opposing rear side 56 corresponding to bottom support plate 14 as shown, for example, in FIG. 1. Reflective electrowetting display device 10 may be a segmented display type in which the image is built of segments. The segments may be switched simultaneously or separately. Each segment includes one electrowetting pixel region or a number of electrowetting pixel regions that may be neighboring or distant from one another. The electrowetting pixel regions included in one segment are switched simultaneously, for example. Electrowetting display device 10 may also be an active matrix driven display type or a passive matrix driven display, for example.

Referring additionally to FIG. 2, in example embodiments, each TFT structure associated with a respective pixel region, e.g., each of first TFT structure 22 and second TFT structure 30, includes a first metal layer 60, e.g., an electrode layer or gate electrode layer that includes a gate 62 and a metal portion 64, disposed on or over first support plate 14. First TFT structure 22 is coupled in signal communication with associated first electrowetting sub-pixel 16 (first electrowetting pixel region 12). In the example embodiment, first TFT structure 22 is switched to either select (activate) or deselect (deactivate) associated electrowetting sub-pixel 16 using active matrix addressing, for example. Similarly, second TFT structure 30 is coupled in signal communication with associated second electrowetting sub-pixel 28 (second electrowetting pixel region 26). In the example embodiment, second TFT structure 30 is switched to either select (activate) or deselect (deactivate) associated electrowetting sub-pixel 28 using active matrix addressing, for example.

A silicon layer, such as a silicon semiconductor layer 66, e.g., a silicon semiconductor layer including an active amorphous silicon, is disposed on or over, e.g., formed or deposited on, a suitable non-conducting substrate, such as a dielectric layer or first passivation layer 68, shown in FIG. 2, which may include a silicon nitride layer, for example.

A second metal layer 70 is disposed, e.g., formed or deposited on, on first passivation layer 68 and at least a portion of silicon semiconductor layer 66. Second metal layer 70 includes a suitable metal material, such as ITO. Second metal layer 70 forms a source 72 and a drain 74 of respective TFT structure 22, 30. Source 72 includes a source line not shown in FIG. 2, to electrically couple source 72 to a respective source driver for transmitting signals to or from the source driver for driving, e.g., activating or deactivating, a respective electrowetting sub-pixel 16, 28. In example embodiments, source 72 and drain 74 are positioned over silicon semiconductor layer 66 and, in combination, cover a first portion of silicon semiconductor layer 66 leaving a second portion of the silicon semiconductor layer uncovered. A second passivation layer 76, e.g., a passivation layer comprising silicon nitride, is disposed on, e.g., formed or deposited on or over, second metal layer 70. Second passivation layer 76 is made of a suitable material to isolate source 72 and drain 74 from ambient conditions.

A conducting channel region 78, formed between source 72 and drain 74, is susceptible to undesirable photoleakage current. In one embodiment, second passivation layer 76 is at least partially positioned on or in conducting channel region 78 and contacts at least a portion of silicon semiconductor layer 66. In the embodiments shown in FIGS. 1 and 2, light-blocking portion 44a has suitable dimensions to extend over at least a portion of source 72, at least a portion of drain 74, and silicon semiconductor layer 66 entirely to act as a light shield to protect silicon semiconductor layer 66, which is highly photosensitive, from undesirable exposure to light. In example embodiments, light-blocking portion 44a has suitable dimensions to extend over silicon semiconductor layer 66 to absorb light and prevent or limit light entering respective pixel region 12, 26 from impinging on the respective TFT structures, e.g., on a surface of silicon semiconductor layer 66. For example, light-blocking portion 44a has a length and a width greater than a respective length and width of silicon semiconductor layer 66. More particularly, silicon semiconductor layer 66 has a first width along a width of gate 62 and a first length perpendicular to the first width and light-blocking portion 44a has a second width along the width of gate 62 greater than the first width and a second length perpendicular to the second width greater than the first length.

A contact, such as a contact hole 80 or a piece of conductive material is formed through a thickness of second passivation layer 76 to electrically couple a third metal layer, e.g., a reflective layer 82 disposed on or over, e.g., formed or deposited on, second passivation layer 76 to drain 74 formed in second metal layer 70 positioned under second passivation layer 76. In example embodiments, reflective layer 82 is electrically coupled to drain 74 of second metal layer 70. In certain embodiments, reflective layer 82 can act as a pixel electrode and a reflective layer. In example embodiments, reflective layer 82 may include any suitable material including, for example, a metal (90%, 95% or greater than 95% metal), an alloy, a doped metal, or a dielectric reflective material. Suitable metal materials for reflective layer 82 include, without limitation, aluminum, silver, gold, copper, nickel, platinum, rhodium, lanthanum, and/or silicon nickel. Suitable alloy materials for reflective layer 82 include, without limitation, aluminum with copper or aluminum with nickel. In further alternative embodiments, reflective layer 82 is made of any suitable material providing a desired specular reflectance. In alternative embodiments, reflective layer 82 includes a suitable diffuse reflective material deposited on or over second passivation layer 76. In this alternative embodiment, any suitable diffuse reflective material, such as titanium dioxide ($TiO_2$), providing a desired diffuse reflectance may be used.

Referring further to FIG. 2, one or more dielectric barrier layers 84 may at least partially separate respective TFT structure 22, 30 from a hydrophobic layer 86. More specifically, in the embodiment shown in FIG. 2, dielectric barrier layer 84 at least partially separates reflective layer 82 from hydrophobic layer 86, such as an amorphous fluoropolymer layer forming a bottom surface of respective electrowetting pixel 16, 28. For example, dielectric barrier layer 84 may be disposed on, e.g., formed or deposited on, reflective layer 82. Dielectric barrier layer 84 may include various materials including one or more organic material layers or a combination of organic and inorganic material layers. A thickness of the insulating dielectric barrier layer 84 may be less than 2 micrometers and may be less than 1 micrometer; for example, insulating dielectric barrier layer 84 may be 100 nanometers to 800 nanometers in thickness in certain embodiments. In example embodiments, hydrophobic layer 86 is an amorphous fluoropolymer layer including any suitable fluoropolymer(s), such as AF1600® fluoropolymer produced by DuPont based in Wilmington, Del. Hydrophobic layer 86 is transparent in the example embodiments.

An additional organic material layer 90 is disposed on, e.g., formed or deposited on, a portion of dielectric barrier layer 84 near and/or under pixel wall portion 20. Organic material layer 90 may include any suitable organic material including, without limitation, a polyacrylate, an epoxy, or a polyimide material, and combinations thereof.

In example embodiments, one or more pixel wall portions 20 form a patterned electrowetting pixel grid over, e.g., on, hydrophobic layer 86. Pixel wall portions 20 may include a photoresist material such as, for example, an epoxy-based negative photoresist material SU-8. The patterned electrowetting pixel grid includes a plurality of rows and a plurality of columns of pixel wall portions 20 that form a perimeter of each electrowetting pixel region in an array of electrowetting pixel regions. Each electrowetting pixel region may have a width and a height in a range of about 50 to 500 micrometers, for example, and, more particularly, in one embodiment, electrowetting pixel regions have a width of 60 micrometers and a height of 120 micrometers.

As described above, first fluid 25, e.g., a liquid such as an opaque electrowetting oil, which may have a thickness in a range of 1 micrometer to 10 micrometers, for example, overlays hydrophobic layer 86. The first liquid is partitioned by pixel wall portions 20. A second fluid 92, as shown in FIG. 1, e.g., a liquid such as a liquid electrolyte solution, overlays the first liquid and, in certain embodiments, at least a portion of pixel wall portions 20. In certain embodiments, as described above, the second liquid may be electrically conductive and/or polar. For example, the second liquid may be water or a water solution, or a salt solution such as a solution of potassium chloride in water or a mixture of water and ethyl alcohol. In certain embodiments, the second liquid is transparent, but may be colored or absorbing. The first liquid is electrically non-conductive and may, for example, be an alkane-like hexadecane or (silicone) oil. As described herein, the second liquid is immiscible with the first liquid. Light transmission through the electrowetting pixel regions is controlled by the application of an electric potential to the respective electrowetting pixel region, which results in a movement of the second fluid in the electrowetting pixel region, thereby displacing the first fluid in the electrowetting pixel region.

As described above, hydrophobic layer 86 is arranged on or over bottom support plate 14 to create an electrowetting surface area. The hydrophobic character of hydrophobic layer 86 causes the first liquid to adjoin preferentially to hydrophobic layer 86 because the first liquid has a higher wettability with respect to a top surface of hydrophobic layer 86 than the second liquid in the absence of a voltage. Wettability relates to the relative affinity of a fluid, e.g., a liquid, for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid, e.g., the liquid, tends to form a film on the surface of the solid.

Top support plate 15, as shown in FIGS. 1 and 2, covers second fluid 92 and one or more spacers, not shown in FIGS. 1 and 2, to maintain second fluid 92 over electrowetting pixel grid. In one embodiment, the spacers are positioned between top support plate 15 and pixel wall portions 20. In example embodiments, the spacer is coupled to and extends from top support plate 15 to contact a contact surface on a first or distal end of one or more corresponding pixel wall portions 20. In certain embodiments, one or more components or layers may be positioned between top support plate 15 and the spacers. In this arrangement, a contact surface of the spacer contacts a contact surface of corresponding pixel wall portion 20 to provide a stable contact joint at an interface between pixel wall portion 20 and the spacer, providing mechanical strength at the interface that is less sensitive to overflow and/or leakage of the first fluid and/or the second fluid contained within the pixel regions. In alternative embodiments, the spacer does not rest on pixel wall portion 20 but is substantially aligned with pixel wall portion 20. This arrangement may allow the spacer to come into contact with pixel wall portion 20 upon a sufficient pressure or force being applied to the top support plate. Multiple spacers may be interspersed throughout the electrowetting pixel grid. A seal extends about a perimeter of electrowetting display device 10 to contain the first liquid and the second liquid within the fluid region of the cavity. A voltage applied across, among other things, second fluid 92 and a TFT structure of individual electrowetting pixel regions controls transmittance or reflectance of the associated electrowetting pixel region.

In various embodiments described herein, electronic devices include electrowetting displays (EWDs) for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

For a reflective EWD, when the electrowetting sub-pixel is in a resting state (i.e., the closed or off state, with no electric potential applied), the first liquid, e.g., the opaque electrowetting oil, is distributed throughout the electrowetting sub-pixel to substantially cover a display surface area of the electrowetting sub-pixel. The first liquid absorbs light and the electrowetting sub-pixel in this condition appears dark, e.g., black, in one embodiment. But when the electric potential is applied, the electrowetting sub-pixel is in an active state (i.e., an at least partially open state—the on state—with an electric potential applied), the second liquid moves into the electrowetting sub-pixel displacing the first liquid so that the first liquid is no longer distributed throughout the electrowetting sub-pixel. Light can then enter the electrowetting sub-pixel and impinge upon a surface of a reflective portion or layer, for example, positioned at or near a bottom of the electrowetting pixel region. The light is then reflected by the reflective portion or layer to reflect out of the electrowetting pixel region. If the reflective surfaces reflect only a portion of the light spectrum or if color filters are incorporated into the electrowetting pixel structure, the electrowetting sub-pixel may appear to be gray or have color.

A display device, such as an electrowetting display device, may include a transmissive, reflective or transflective display that generally includes an array of pixel regions (e.g., an array of sub-pixels) configured to be operated by an active matrix addressing scheme. For example, rows and columns of electrowetting sub-pixels are operated by controlling voltage levels on a plurality of source lines and gate lines. In this fashion, the display device may produce an image by selecting particular sub-pixels to transmit, reflect or block light. Sub-pixels are addressed (e.g., selected) via rows and columns of the source lines and the gate lines that are electrically connected to transistors (e.g., TFT structures used as switches) included in each pixel region. The transistors occupy a relatively small fraction of the area of each pixel region to allow light to efficiently pass through (or reflect from) the sub-pixel.

The array of pixel regions is sandwiched between two support plates, such as bottom support plate 14 and opposing top support plate 15. The support plates may be made of any suitable material including, without limitation, plastic, glass, quartz, and semiconducting materials, and may be made of a rigid material or a flexible material, for example. The pixel regions include various layers of materials built upon the bottom support plate, e.g., within or under the sub-pixels. One example layer is an amorphous fluoropolymer (AF1600®) with hydrophobic behavior. The pixel walls may be formed on a top surface of the hydrophobic layer. The bottom support plate may be opaque while the top support plate is transparent. Describing a component or material as being "transparent" generally means that the component or the material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent.

Example embodiments described herein include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixels of a (reflective) electrowetting display are viewed.

As described above, individual reflective electrowetting pixel regions may include an electrode layer or gate electrode layer containing or coupled to the drive electronics like TFT structures, source lines, and gate lines on the bottom support plate, a reflective layer over the electrode layer, a pixel electrode adjacent to the reflective layer, a barrier layer on the reflective layer, and a hydrophobic layer on the barrier layer. The pixel electrode in principle is close to the liquids in the pixel region to minimize power consumption. In one alternative embodiment, a patterned layer of indium tin oxide (ITO) is deposited as the pixel electrode over the reflective layer. In another alternative embodiment, the pixel electrode is under the reflective layer. The electrode layer, for example, can be an electrode layer containing at least part of the drive electronics if the reflective layer is used as the electrode or the electrode layer can contain the pixel electrodes in contact with the reflective layer. Pixel wall portions of each pixel region, the hydrophobic layer, and the transparent top support plate at least partially enclose a liquid region within the cavity that contains the first liquid which is electrically non-conductive, e.g., an opaque oil retained in the individual electrowetting sub-pixels by pixel wall portions, and the second liquid, e.g., an electrolyte solution, that is electrically conductive or polar and may be a water or a salt solution, such as a solution of potassium chloride in water. The second liquid may be transparent or may be colored. The second liquid is immiscible with the first liquid. In general, substances are "immiscible" with one another if the substances do not substantially form a solution, although in a particular embodiment the second liquid might not be perfectly immiscible with the first liquid. In general, an "opaque" liquid is a liquid that appears black to an observer. For example, an opaque liquid strongly absorbs a broad spectrum of wavelengths (e.g., including those of red, green and blue light) in the visible region of electromagnetic radiation appearing black. However, in certain embodiments an opaque liquid may absorb a relatively narrower spectrum of wavelengths in the visible region of electromagnetic radiation and may not appear perfectly black.

In some embodiments, the opaque liquid is a nonpolar electrowetting oil. In certain embodiments, the first liquid may absorb at least a portion of the visible light spectrum. The first liquid may be transmissive for a portion of the visible light spectrum, forming a color filter. For this purpose, the first liquid may be colored by addition of pigment particles or a dye. Alternatively, the first liquid may be black, for example by absorbing substantially all portions of the visible light spectrum, or reflecting. A reflective first liquid may reflect the entire visible light spectrum, making the layer appear white, or a portion of the entire visible light spectrum, making the layer have a color. In example embodiments, the first liquid is black and, therefore, absorbs substantially all portions of an optical light spectrum.

Spacers and edge seals mechanically couple the first support plate with the overlying, opposing second support plate, forming a separation between the first support plate and the second support plate, and contributing to the mechanical integrity of the electrowetting display device. Spacers can be at least partially transparent so as to not hinder throughput of light in the electrowetting display. The transparency of spacers may at least partially depend on the refractive index of the spacer material, which can be similar to or the same as the refractive indices of surrounding media. Spacers may also be chemically inert to surrounding media. Edge seals, for example, disposed along a periphery of an array of electrowetting pixels, may contribute to retaining liquids (e.g., the first liquid and the second liquid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based at least in part on electronic signals representative of static image and/or video data. The code may cause the processor to modulate the optical properties of pixels by controlling electrical signals (e.g., voltages, currents, and fields) on, over, and/or in layers of the electrowetting display device. An example electrowetting display device 100, such as reflective electrowetting display device 10, for example, is schematically illustrated in FIG. 3. Electrowetting display device 100 includes a timing controller 102, a source driver (data driver) 104, a gate driver (scan driver) 106, a voltage generator 108, and an electrowetting display panel 110. Electrowetting display panel 110 is driven by timing controller 102, source driver 104, gate driver 106 and voltage generator 108.

As an example of general operation of electrowetting display device 100, responsive to a first data signal DG1 and a first control signal C1 from an external image source, e.g., a graphic controller (not illustrated), timing controller 102 applies a second data signal DG2 and a second control signal C2 to source driver 104; a third control signal C3 to gate driver 106; and a fourth control signal C4 to voltage generator 108.

Source driver 104 converts the second data signal DG2 to voltages, i.e., data signals, and applies the data signals D1, . . . , Dp−1, Dp, Dp+1, . . . , Dm to electrowetting display panel 110. Gate driver 106 sequentially applies scan signals S1, . . . , Sq−1, Sq, . . . , Sn to electrowetting display panel 110 in response to the third control signal C3.

Voltage generator 108 applies a common voltage Vcom to electrowetting display panel 110 in response to the fourth control signal C4. Although not illustrated in FIG. 3, voltage generator 108 generates various voltages required by timing controller 102, source driver 104, and gate driver 106.

Pixel regions 112 are positioned adjacent to crossing points of the data lines D and the gate lines S and, thus, are arranged in a grid of rows and columns. Each pixel region 112 includes a hydrophobic surface (not illustrated in FIG. 3), a thin film transistor (TFT) structure 114, and a pixel electrode 116 under the hydrophobic surface. Each pixel region 112 may also include a storage capacitor (not illustrated) under the hydrophobic surface. A plurality of intersecting pixel wall portions 118 separates pixel regions 112. Pixel regions 112 can represent pixels within electrowetting display device 100 or sub-pixels within electrowetting display device 100, depending upon the application for electrowetting display device 100.

Electrowetting display panel 110 includes m data lines D, i.e., source lines, to transmit the data voltages and n gate lines S, i.e., scan lines, to transmit a gate-on signal to TFT structures 114 to control pixel regions 112. Thus, timing controller 102 controls source driver 104 and gate driver 106. Timing controller 102 applies a second data signal DG2 and a second control signal C2 to source driver 104; a third control signal C3 to gate driver 106; and a fourth control signal C4 to voltage generator 108 to drive pixel regions 112. Gate driver 106 sequentially applies scan signals S1, . . . , Sq−1, Sq, . . . , Sn to electrowetting display panel 110 in response to the third control signal C3 to activate rows of pixel regions 112 via the gates of TFT structures 114. Source driver 104 converts the second data signal DG2 to voltages, i.e., data signals, and applies the data signals D1, . . . , Dp−1, Dp, Dp+1, . . . , Dm to sources of TFT structures 114 of pixel regions 112 within an activated row of pixel regions 112 to thereby activate (or leave inactive) pixel regions 112 with the activated row of pixel regions 112.

In example embodiments, electrowetting display device 100 may be a transmissive, reflective or transflective display that generally includes an array of pixels or sub-pixels (e.g., pixel regions 112 of FIG. 3) configured to be operated by an active matrix addressing scheme. For example, rows and columns of electrowetting pixel regions 112 are operated by controlling voltage levels on a plurality of source lines (e.g., source lines D of FIG. 3) and gate lines (e.g., gate lines S of FIG. 3). In this fashion, electrowetting display device 100 may produce an image by selecting particular pixel regions 112 to at least partly transmit, reflect or block light. Pixel regions 112 are addressed (e.g., selected) via rows and columns of the source lines and gate lines that are electrically connected to transistors (e.g., used as switches) included in each pixel region 112.

When a voltage V applied between signal lines is set at a non-zero active signal level, pixel region 112 will enter into an active state. Electrostatic forces will move second liquid 92 toward the electrode layer, thereby repelling first fluid 25 from the area of the hydrophobic layer to a pixel wall portion at least partially surrounding the area of the hydrophobic layer to a droplet-like shape. This action uncovers first fluid 25 from the surface of the hydrophobic layer of pixel region 112. When the voltage across pixel region 112 is returned to an inactive signal level of zero volts or a value near to zero volts, pixel region 112 will return to an inactive state, where first fluid 25 flows back to cover the hydrophobic layer. In this way, first fluid 25 forms an electrically controllable optical switch in each pixel region 112.

Generally, TFT structure 114 includes a gate electrode that is electrically connected to a corresponding scan line of the scan lines S, a source electrode that is electrically connected to a corresponding data line of the data lines D, and a drain electrode that is electrically connected to pixel electrode 116. Thus, pixel regions 112 are operated, i.e., driving of electrowetting display device 100, based upon the scan lines S and the data lines D of FIG. 3.

For driving of electrowetting displays via the scan lines S and the data lines D, a dedicated gate scanning algorithm may generally be implemented. The gate scanning algorithm generally defines an address timing for addressing rows of pixel regions 112. Within each input frame, each row (corresponding to the scan lines S) of electrowetting elements 120 (i.e., pixel region 112) within electrowetting display device 100 generally needs to be written to twice. On occasion, the amount of writing can be more, depending on the actual drive scheme implementation. In general, the first write action discharges a pixel region 112 to a reset level, e.g., a black level voltage, which is also referred to as a reset of pixel region 112. The second write action generally charges pixel region 112 to an actual required display data value. Often, pixel regions 112 may need to be refreshed to maintain their appearance when the corresponding data value for a particular pixel region 112 does not change. This is especially true when electrowetting display device 100 is displaying a still image when all of pixel regions 112 may need to be refreshed. A refresh sequence generally involves a reset sequence followed by a repeat sequence, which recharges pixel regions 112 with their display data values.

Figure 4:
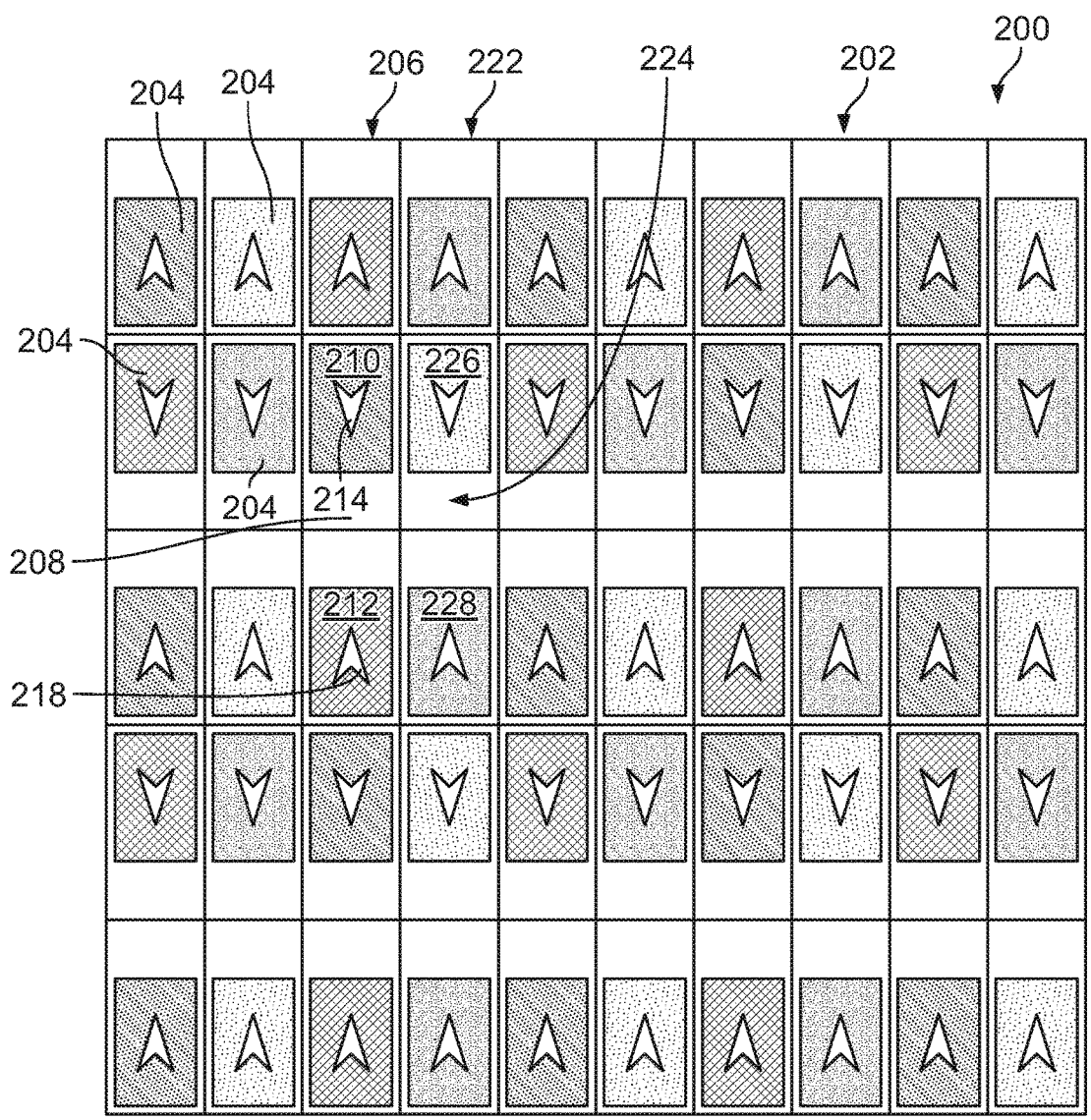
FIG. 4 is top view of a portion of an example electrowetting display device including a plurality of electrowetting pixel regions, according to one embodiment.

Referring now to FIGS. 4-7, an example electrowetting display device 200 includes an array 202 of electrowetting pixel regions 204. Array 202 includes a plurality of electrowetting pixel regions 204, including, for example, first electrowetting pixel region 12 and second electrowetting pixel region 26 shown in FIGS. 1 and 2, each including an associated sub-pixel. Electrowetting pixel regions 204 are positioned between bottom support plate 14 and top support plate 15 and arranged in a plurality of columns each including a plurality of pixel regions 204. Array 202 of electrowetting pixel regions 204 may have any suitable pixel region pattern including, for example, the pixel region patterns shown in FIGS. 4, 5, and 7. In one embodiment, as shown in FIG. 4, electrowetting pixel regions 204 are arranged in a pattern that repeats in adjacent columns of electrowetting pixel regions.

Figure 5:
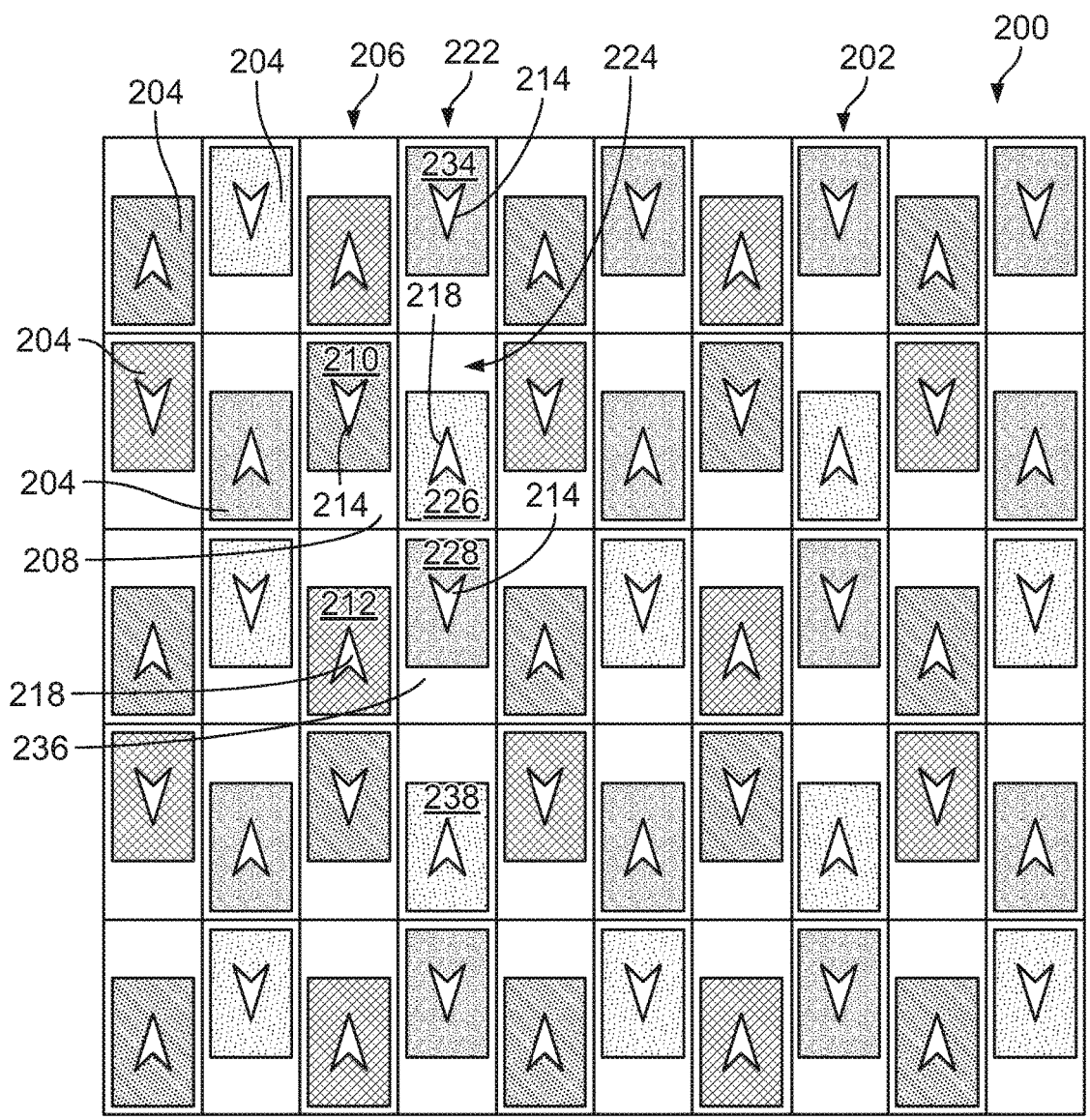
FIG. 5 is top view of a portion of an example electrowetting display device including a plurality of electrowetting pixel regions, according to one embodiment.
Figure 7:
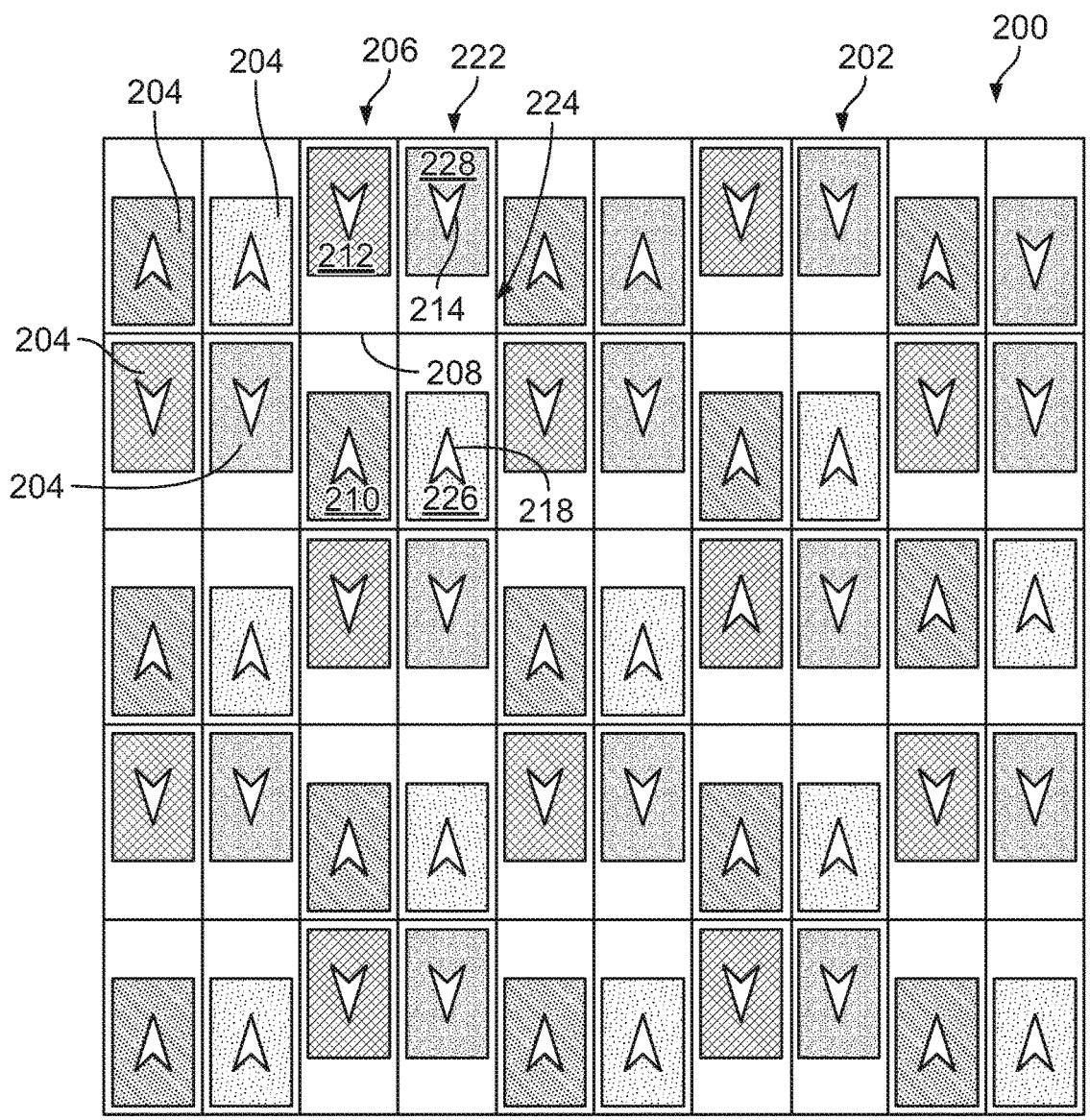
FIG. 7 is top view of a portion of an example electrowetting display device including a plurality of electrowetting pixel regions, according to one embodiment.

FIG. 4 is top view of a portion of electrowetting display device 200 including a plurality of electrowetting pixel regions, according to one embodiment. As shown in FIG. 4, a first column 206 of electrowetting pixel regions 204 includes a first light-blocking portion 208, such as a light-blocking portion 44, positioned between a first (red) electrowetting pixel region 210, such as first pixel region 12 shown in FIGS. 1 and 2, and a second (blue) electrowetting pixel region 212, such as second pixel region 26 shown in FIGS. 1 and 2. When first electrowetting pixel region 210 is activated, the first fluid in first electrowetting pixel region 210 moves in a first direction 214 toward a first TFT structure 216 in first electrowetting pixel region 210 adjacent a first pixel wall portion (not shown in FIG. 4) positioned under light-blocking portion 208 and, when second electrowetting pixel region 212 is activated, the first fluid in second electrowetting pixel region 212 moves in a second direction 218 opposite first direction 214 toward a second TFT structure 220 adjacent the first pixel wall portion positioned under first light-blocking portion 208. Similarly, a second column 222 of electrowetting pixel regions 202 adjacent first column 206 includes a second light-blocking portion 224 positioned between a third (green) electrowetting pixel region 226 adjacent first electrowetting pixel region 210 and a fourth (transparent (white)) electrowetting pixel region 228 adjacent second electrowetting pixel region 212. When third electrowetting pixel region 226 is activated, the first fluid in third electrowetting pixel region 206 moves in first direction 214 toward a third TFT structure 230 in third electrowetting pixel region 226 adjacent a second pixel wall portion (not shown in FIG. 4) collinear with the first pixel wall portion and positioned under second light-blocking portion 224 and, when fourth electrowetting pixel region 228 is activated, the first fluid in fourth electrowetting pixel region 228 moves in second direction 218 toward a fourth TFT structure 232 in fourth electrowetting pixel region 228 adjacent the second pixel wall portion positioned under second light-blocking portion 224. Alternative pixel region patterns, such as shown in FIGS. 5 and 7, shift the light-blocking portions to avoid or minimize a potentially visible black strip formed as a result of adjacent, collinear light-blocking portions shown in FIG. 4. For example, the light-blocking portions may be shifted at each adjacent column, as shown in FIG. 5, or the light-blocking portions may be shifted at a multiple column, such as every other column, as shown in FIG. 7.

Figure 6:
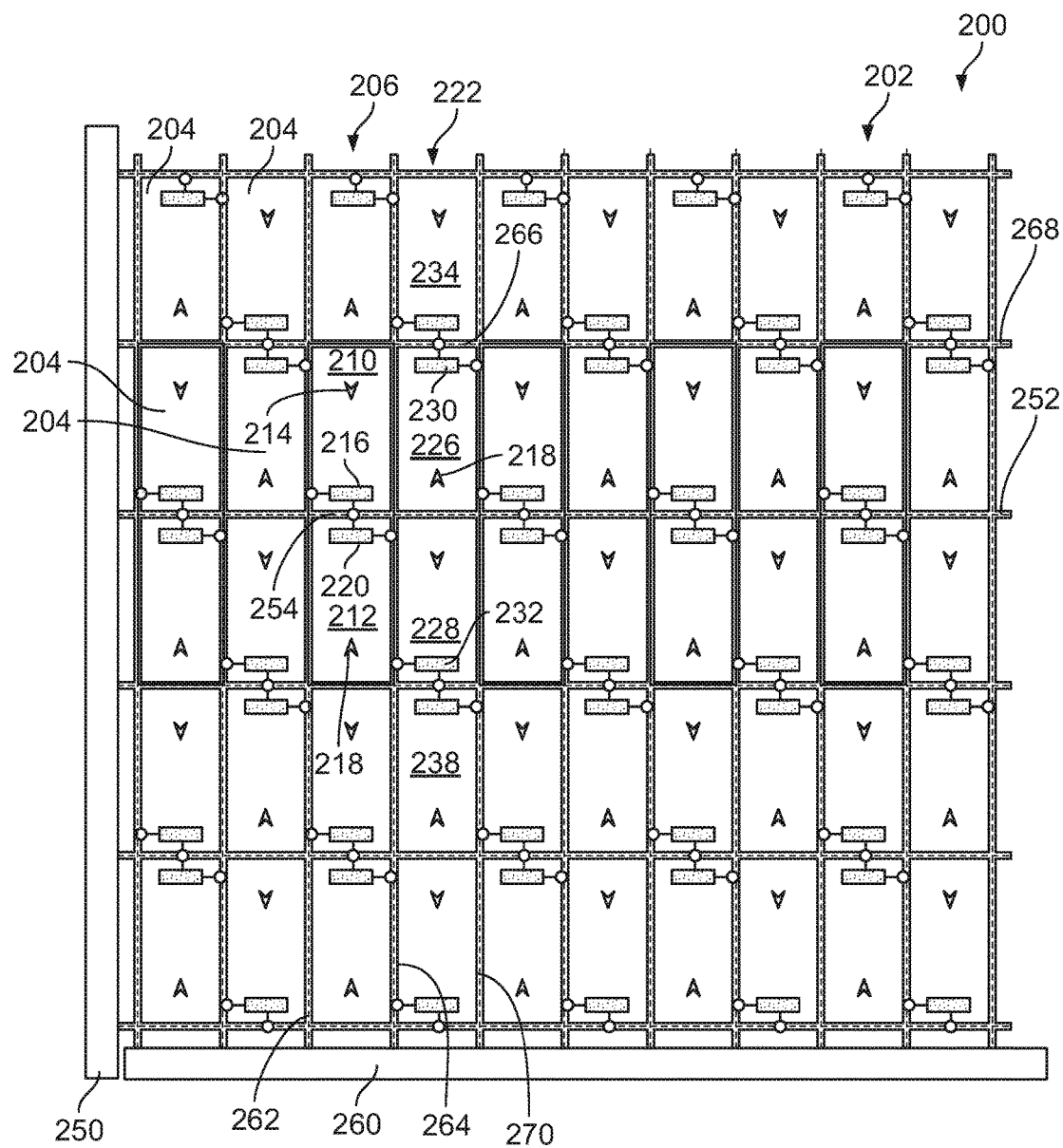
FIG. 6 is top view of an example array of thin film transistor (TFT) structures suitable for driving associated pixel regions of the example electrowetting display device of FIG. 5, according to one embodiment.

FIG. 5 is top view of a portion of electrowetting display device 200 including a plurality of electrowetting pixel regions, according to one embodiment. FIG. 6 is top view of an example array of thin film transistor (TFT) structures suitable for driving associated pixel regions of electrowetting display device 200 of FIG. 5, according to one embodiment. In the pixel region pattern shown in FIGS. 5 and 6, first column 206 of electrowetting pixel regions 204 includes first light-blocking portion 208 positioned between first (red) electrowetting pixel region 210 and second (blue) electrowetting pixel region 212 in first column 206. The first fluid in first electrowetting pixel region 210 moves in first direction 214 toward first TFT structure 216 adjacent the first pixel wall portion positioned under first light-blocking portion 208 when first electrowetting pixel region 210 is activated and the first fluid in second electrowetting pixel region 212 moves in second direction 218 toward second TFT structure 220 adjacent the first pixel wall portion positioned under light-blocking portion 208 when second electrowetting pixel region 212 is activated. However, in this embodiment, second light-blocking portion 224 is positioned between third (green) electrowetting pixel region 226 adjacent first electrowetting pixel region 210 and a fifth (transparent (white)) electrowetting pixel region 234 positioned above third electrowetting pixel region 226. When third electrowetting pixel region 226 is activated, the first fluid in third electrowetting pixel region 226 moves in second direction 218 toward third TFT structure 230 in third electrowetting pixel region 226 adjacent a pixel wall portion positioned under second light-blocking portion 224. When fourth electrowetting pixel region 228 is activated, the first fluid in fourth electrowetting pixel region 228 moves in first direction 214 toward fourth TFT structure 232 in fourth electrowetting pixel region 228 adjacent a pixel wall portion positioned under a third light-blocking portion 236 positioned between fourth electrowetting pixel region 228 and a sixth electrowetting pixel region 238 positioned below fourth electrowetting pixel region 228, as shown in FIG. 5. In this embodiment, the light-blocking portions are shifted in each adjacent column of pixel regions.

Referring further to FIG. 6, in an example embodiment, electrowetting display device 200 includes a gate driver 250 operatively coupled to first TFT structure 216 and second TFT structure 220 via a gate line 252. In example embodiments, electrowetting display device 200 includes a plurality of gate lines parallel to gate line 252 to operatively couple a respective TFT structure of each pixel region 204 to gate driver 250. Gate driver 250 is configured to activate first pixel region 210 and second pixel region 212. In one embodiment, gate driver 250 transmits a first signal through gate line 252 to activate first pixel region 210. With first pixel region 210 activated, the first liquid, e.g., the electrowetting oil, in first pixel region 210 moves in first direction 214 toward first TFT structure 216 adjacent first pixel wall portion 254. Gate driver 250 transmits the same signal or a second signal through gate line 252 to activate second pixel region 212. With second pixel region 212 activated, the first liquid in second pixel region 212 moves in second direction 218 opposite first direction 214 toward second TFT structure 220 adjacent first pixel wall portion 254.

Electrowetting display device 200 also includes a source driver 260 and a plurality of parallel source lines operatively coupling each pixel region 204, e.g., a respective TFT structure of each pixel region 204, to source driver 260. For example, as shown in FIG. 6, a first source line 262 operatively couples first pixel region 210 to source driver 260 and a second source line 264 operatively couples second pixel region 212 to source driver 260.

Referring again to FIG. 5, in certain embodiments, first pixel region 210 and second pixel region 212 are arranged in first column 206 of a plurality of columns of pixel regions 204. Third pixel region 226 is positioned in second column 222 of the plurality of columns adjacent first pixel region 210. Third pixel region 226 includes third TFT structure 230 over first support plate 15. A second pixel wall portion 266 over first support plate 14 partially forms a perimeter of third pixel region 226 and third TFT structure 230 is positioned adjacent second pixel wall portion 266. As shown in FIG. 5, second light-blocking portion 224 is disposed on the inner surface of top support plate 15 and positioned over third TFT structure 230. In this embodiment, gate driver 250 is operatively coupled to first TFT structure 216 via first gate line 252. A second gate line 268 operatively couples third TFT structure 230 to gate driver 250. Gate driver 250 is configured to transmit a signal through second gate line 268 to activate third pixel region 226. With third pixel region 226 activated, the first liquid in third pixel region 226 moves toward third TFT structure 230 adjacent second pixel wall portion 266. As shown in FIGS. 5 and 6, the first liquid in first pixel region 210 moves in first direction 214 and the first liquid in third pixel region 226 moves in second direction 218 opposite first direction 214. A third source line 270 operatively couples third pixel region 226, e.g., third TFT structure 230, to source driver 260.

FIG. 7 is top view of a portion of electrowetting display device 200 including a plurality of electrowetting pixel regions, according to one embodiment. In this embodiment, the light-blocking portions are shifted at a multiple column interval, e.g., the light-blocking portions in two adjacent columns are collinear. As shown in FIG. 7, a first column 206 of electrowetting pixel regions 204 includes first light-blocking portion 208, such as a light-blocking portion 44, positioned between a first (red) electrowetting pixel region 210, such as first pixel region 12 shown in FIGS. 1 and 2, and second (blue) electrowetting pixel region 212, such as second pixel region 26 shown in FIGS. 1 and 2, positioned above first electrowetting pixel region 210. When first electrowetting pixel region 210 is activated, the first fluid in first electrowetting pixel region 210 moves in second direction 218 toward first TFT structure 216 in first electrowetting pixel region 210 adjacent a first pixel wall portion (not shown in FIG. 7) positioned under light-blocking portion 208 and, when second electrowetting pixel region 212 is activated, the first fluid in second electrowetting pixel region 212 moves in first direction 214 opposite second direction 218 toward second TFT structure 220 adjacent the first pixel wall portion positioned under first light-blocking portion 208. In second column 222 of electrowetting pixel regions 202 adjacent first column 206, second light-blocking portion 224 is positioned between third (green) electrowetting pixel region 226 adjacent first electrowetting pixel region 210 and fourth (transparent (white)) electrowetting pixel region 228 adjacent second electrowetting pixel region 212 and above third electrowetting pixel region 226. In this embodiment, second light-blocking portion 224 is collinear with first light-blocking portion 208 in first column 206. When third electrowetting pixel region 226 is activated, the first fluid in third electrowetting pixel region 206 moves in second direction 218 toward third TFT structure 230 in third electrowetting pixel region 226 adjacent a second pixel wall portion (not shown in FIG. 7) collinear with the first pixel wall portion and positioned under second light-blocking portion 224 and, when fourth electrowetting pixel region 228 is activated, the first fluid in fourth electrowetting pixel region 228 moves in first direction 214 toward fourth TFT structure 232 in fourth electrowetting pixel region 228 adjacent the second pixel wall portion positioned under second light-blocking portion 224.

In the example alternative embodiment shown in FIG. 7, gate driver 250 is operatively coupled to first electrowetting pixel region 210, e.g., first TFT structure 216, second electrowetting pixel region 212, e.g., second TFT structure 220, third electrowetting pixel region 226, e.g., third TFT structure 230, and fourth electrowetting pixel region 228, e.g., fourth TFT structure 232, via first gate line 252. Gate driver 250 transmits a signal through first gate line 252 to activate each of first electrowetting pixel region 210, second electrowetting pixel region 212, third electrowetting pixel region 226, and fourth electrowetting pixel region 228. With first pixel region 210 and second pixel region 212 activated, the first liquid in first pixel region 210 moves toward first TFT structure 216 adjacent the first pixel wall portion and the first liquid in second pixel region 212 moves toward second TFT structure 220 adjacent the first pixel wall portion. With third pixel region 226 and fourth pixel region 228 activated, the first liquid in third pixel region 226 moves toward third TFT structure 230 adjacent the second pixel wall portion and the first liquid in fourth pixel region 228 moves toward fourth TFT structure 232 adjacent the second pixel wall portion. As shown in FIG. 7, the first liquid in first pixel region 210 and the first liquid in third pixel region 226 moves in second direction 218 and the first liquid in second pixel region 212 and the first liquid in fourth pixel region 228 moves in first direction 214.

In one embodiment, an electrowetting display device includes a first support plate and an opposing second support plate. A first column of a plurality of electrowetting pixel regions is between the first support plate and the second support plate. A first electrowetting pixel region in the first column includes a plurality of pixel wall portions over the first support plate. The plurality of pixel wall portions forms a perimeter of the first electrowetting pixel region. A first thin film transistor (TFT) structure is over the first support plate. The first TFT structure is disposed adjacent a first pixel wall portion of the plurality of pixel wall portions. A second electrowetting pixel region in the first column is adjacent the first electrowetting pixel region. The second electrowetting pixel region includes a second thin film transistor (TFT) structure over the first support plate. The second TFT structure is disposed adjacent the first pixel wall portion. A light-blocking layer is disposed on an inner surface of the second support plate. The light-blocking layer includes a first light-blocking portion positioned over the first pixel wall region. The first light-blocking portion extends over the first TFT structure and the second TFT structure.

An oil and an electrolyte solution that is immiscible with the oil are disposed in the first pixel region and the second pixel region. A gate line operatively couples the first TFT structure and the second TFT structure to a gate driver. The gate driver transmits a signal to each of the first pixel region and the second pixel region to activate the first pixel region and the second pixel region. With the first pixel region and the second pixel region activated, the oil within the first pixel region flows in a first direction toward the first pixel wall portion and the oil in the second pixel region flows in a second direction opposite the first direction toward the first pixel wall portion.

A second column of a plurality of electrowetting pixel regions is between the first support plate and the second support plate adjacent the first column. A third electrowetting pixel region in the second column is adjacent the first pixel region. The third electrowetting pixel region includes a second plurality of pixel wall portions over the first support plate. The second plurality of pixel wall portions forms a perimeter of the third electrowetting pixel region. A third thin film transistor (TFT) structure is over the first support plate. The third TFT structure is disposed adjacent a second pixel wall portion of the second plurality of pixel wall portions. The second pixel wall portion is positioned opposite a third pixel wall portion of the second plurality of pixel wall portions collinear with the first pixel wall portion. The light-blocking layer includes a second light-blocking portion positioned over the second pixel wall portion. The second light-blocking portion extends over the third TFT structure.

In one embodiment, a display device includes a first support plate and an opposing second support plate. A first pixel region is between the first support plate and the second support plate. The first pixel region includes a first thin film transistor (TFT) structure over the first support plate. A second pixel region is between the first support plate and the second support plate and adjacent the first pixel region. The second pixel region includes a second thin film transistor (TFT) structure over the first support plate. A first pixel wall portion is over the first support plate. The first pixel wall portion is between the first pixel region and the second pixel region. Each of the first TFT structure and the second TFT structure is positioned adjacent the first pixel wall portion. A first light-blocking portion disposed on an inner surface of the second support plate is positioned over the first TFT structure and the second TFT structure. The first pixel wall portion partially forms a perimeter of the first pixel region and partially forms a perimeter of the second pixel region. In a particular embodiment, a color filter layer is disposed on the inner surface of the second support plate. The color filter layer includes a first color filter portion associated with the first pixel region. A first segment of the first color filter portion is positioned over the first pixel wall portion. A second color filter portion is associated with the second pixel region. A second segment of the second color filter portion is disposed on the first segment to form the first light-blocking portion.

A gate line operatively couples the first TFT structure and the second TFT structure to a gate driver. The gate driver is configured to activate each of the first pixel region and the second pixel region. A first liquid and a second liquid that is immiscible with the first liquid are disposed in the first pixel region and the second pixel region. The gate driver is configured to transmit a first signal through the gate line to activate the first pixel region. With the first pixel region activated, the first liquid in the first pixel region is positioned over the first TFT structure adjacent the first pixel wall portion. The gate driver is configured to transmit a second signal through the gate line to activate the second pixel region. With the second pixel region activated, the first liquid in the second pixel region is positioned over the second TFT structure adjacent the first pixel wall portion. In this embodiment, a first source line operatively couples the first pixel region to a source driver and a second source line operatively coupling the second pixel region to the source driver.

In this embodiment, the first pixel region and the second pixel region are arranged in a first column of a plurality of columns of pixel regions. The display device further includes a third pixel region between the first support plate and the second support plate. The third pixel region is positioned in a second column of the plurality of columns adjacent the first pixel region. The third pixel region includes a third thin film transistor (TFT) structure over the first support plate. A second pixel wall portion is over the first support plate. The second pixel wall portion is positioned opposite a third pixel wall portion collinear with the first pixel wall portion. The second pixel wall portion and the third pixel wall portion partially forming a perimeter of the third pixel region. The third TFT structure is positioned adjacent the second pixel wall portion. A second light-blocking portion is disposed on the inner surface of the second support plate. The second light-blocking portion is positioned over the third TFT structure.

A first liquid and a second liquid that is immiscible with the first liquid are disposed in the first pixel region and the third pixel region. The display device includes a gate driver and a first gate line operatively coupling the first TFT structure to the gate driver. The gate driver is configured to transmit a first signal through the first gate line to activate the first pixel region. With the first pixel region activated, the first liquid in the first pixel region moves toward the first TFT structure adjacent the first pixel wall portion. A second gate line operatively couples the third TFT structure to the gate driver. The gate driver is configured to transmit a second signal through the second gate line to activate the third pixel region. With the third pixel region activated, the first liquid in the third pixel region moves toward the third TFT structure adjacent the second pixel wall portion. With the first pixel region activated, a first portion of the first liquid in the first pixel region moves in a first direction toward the first TFT structure and, with the third pixel region activated, a second portion of the first liquid in the third pixel region moves in a second direction opposite the first direction toward the third TFT structure. In this embodiment, a source line operatively couples the first TFT structure to the source driver and the third TFT structure to the source driver.

In one embodiment, the second pixel wall is collinear with the first pixel wall. The display device includes a gate driver and a gate line operatively coupling the first TFT structure and the third TFT structure to the gate driver. The gate driver transmits a signal through the gate line to activate each of the first pixel region and the third pixel region. With the first pixel region activated, the first liquid in the first pixel region moves toward the first TFT structure adjacent the first pixel wall portion and with the third pixel region activated, the first liquid in the third pixel region moves toward the third TFT structure adjacent the second pixel wall portion. A first portion of the first liquid in the first pixel region and a second portion of the first liquid in the third pixel region move in a first direction.

In one embodiment, a display device includes a first support plate and an opposing second support plate. A first pixel region is between the first support plate and the second support plate and arranged in a first column of a plurality of columns of pixel regions. The first pixel region includes a plurality of pixel wall portions forming a perimeter of the first pixel region. A first thin film transistor (TFT) structure is adjacent a first pixel wall portion of the plurality of pixel wall portions. A first light-blocking portion is disposed over the first TFT structure. A second pixel region is between the first support plate and the second support plate and arranged in a second column of the plurality of columns of pixel regions. The second pixel region is positioned adjacent the first pixel region. The second pixel region includes a second plurality of pixel wall portions forming a perimeter of the second pixel region. A second thin film transistor (TFT) structure is adjacent a second pixel wall portion of the second plurality of pixel wall portions. The second pixel wall portion is positioned opposite a third pixel wall portion of the second plurality of pixel wall portions. The third pixel wall portion is collinear with the first pixel wall portion. A second light-absorbing portion is disposed over the second TFT structure. The display device includes a gate driver. A first gate line operatively couples the first TFT structure to the gate driver. The gate driver is configured to transmit a first signal through the first gate line to activate the first pixel region. A second gate line operatively couples the second TFT structure to the gate driver. The gate driver is configured to transmit a second signal through the second gate line to activate the second pixel region.

In this embodiment, a third pixel region is between the first support plate and the second support plate and arranged in the first column adjacent the first pixel region. The third pixel region includes a third thin film transistor (TFT) structure adjacent the first pixel wall portion. The first light-blocking portion is disposed over the third TFT structure. The display device includes a gate driver and a gate line operatively coupling the first TFT structure and the third TFT structure to the gate driver. The gate driver is configured to transmit a signal through the gate line to activate each of the first pixel region and the third pixel region.

Figure 8:
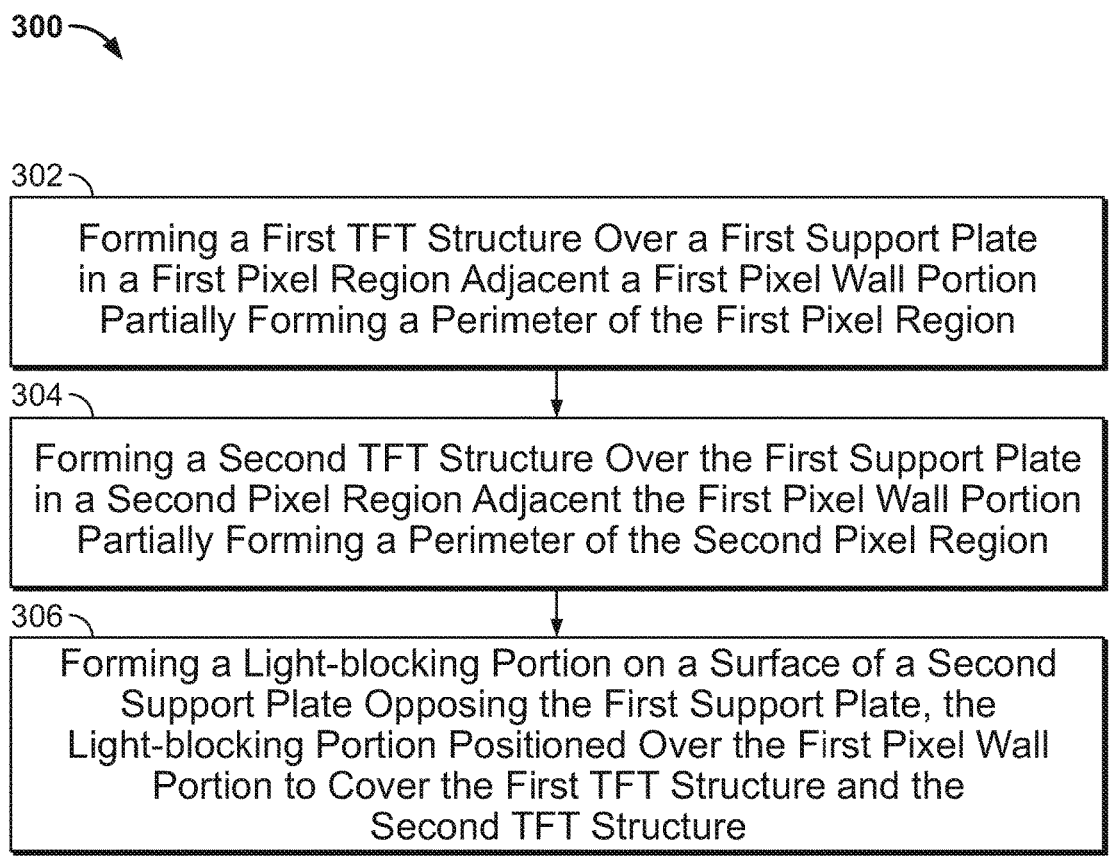
FIG. 8 illustrates an example method for fabricating an electrowetting display device such as shown in FIGS. 1-7.

FIG. 8 is a flow diagram of an example method 300 for fabricating an electrowetting display device, such as electrowetting display device 10, as shown in FIGS. 1-3, or electrowetting display device 100 as shown in FIGS. 4-7. Though claimed subject matter is not limited in this respect, method 300 may be performed manually (e.g., by humans) and/or using automated equipment. At block 302, a first thin film transistor (TFT) structure is formed over a first support plate in a first pixel region adjacent a first pixel wall portion partially forming a perimeter of the first pixel region. In one embodiment, forming 302 a first TFT structure over the first support plate includes forming a first metal layer over the first support plate. The first metal layer includes a gate. In an example embodiment, the first metal layer is deposited on the first support plate using a suitable physical vapor deposition process (PVD) such as sputtering. Additional layers may be positioned between the first metal layer and the first support plate.

A first passivation layer, e.g., a dielectric layer, is formed over, e.g., deposited on, the first metal layer. In example embodiments, the first passivation layer includes a suitable silicon nitride layer. Alternatively, the first passivation layer may include SiON, SiO, or TaO, for example. Any suitable deposition technique may be used, such as CVD, PVD, MBE, or a sputtering technique, for example. A silicon layer, e.g., a semiconductor layer, such as a silicon semiconductor layer including an amorphous silicon material, is formed on the first passivation layer and over the gate. A second metal layer is formed over the first metal layer and on the silicon layer. The second metal layer includes a source and a drain covering a first portion of the silicon layer. A second passivation layer is formed on the second metal layer.

A reflective layer is disposed over, e.g., formed on, the second passivation layer. A contact extends through a thickness of the second passivation layer. In example embodiments, the reflective layer is electrically coupled to the drain formed in the second metal layer positioned under the second passivation layer through the contact. In example embodiments, the reflective layer may include any suitable material including, for example, a metal (90%, 95% or greater than 95% metal), an alloy, a doped metal, or a dielectric reflective material, as described above. In alternative embodiments, the reflective layer includes a suitable diffuse reflective material deposited on or over the second passivation layer.

In certain embodiments, a suitable dielectric barrier layer is formed on or over the reflective layer and over the first TFT structure. For example, the dielectric barrier layer may be deposited on the reflective layer. The dielectric barrier layer may be formed from various materials including one or more organic material layers or a combination of organic and inorganic material layers. In certain embodiments, an organic material layer is formed over, e.g., deposited on, a portion of the dielectric barrier layer near and/or under the pixel wall portions. The organic material layer may include any suitable organic material including, without limitation, a polyacrylate, an epoxy, or a polyimide material, and combinations thereof. A hydrophobic layer, such as an amorphous fluoropolymer layer forming a bottom surface of the electrowetting pixel regions, is formed over the dielectric barrier layer and, in certain embodiments, over the organic material layer. The dielectric barrier layer may at least partially separate the first TFT structure from the hydrophobic layer. More specifically, in one embodiment, the dielectric barrier layer at least partially separates the reflective layer from the hydrophobic layer.

Similarly, at block 304, a second thin film transistor (TFT) structure is formed over the first support plate in a second pixel region adjacent the first pixel wall portion partially forming a perimeter of the second pixel region.

In the example embodiment, one or more pixel wall portions form a patterned electrowetting pixel grid over, e.g., on, the hydrophobic layer. The pixel wall portions may include a photoresist material such as, for example, an epoxy-based negative photoresist material SU-8. The patterned electrowetting pixel grid includes a plurality of rows and a plurality of columns of pixel wall portions that form a perimeter of each electrowetting pixel region in an array of electrowetting pixel regions. Each electrowetting pixel region may have a width and a length in a range of about 50 to 500 micrometers, for example, and, more particularly, in one embodiment, electrowetting pixel regions have a width of 60 micrometers and a height of 120 micrometers.

A light-blocking layer, e.g., an organic light-absorbing material layer, is formed 306 on a second support plate, e.g., a top support plate. In example embodiments, the light-blocking layer includes a suitable black matrix material. In certain embodiments, the light-blocking layer is deposited on a surface of the second support plate using a suitable deposition process or a suitable printing process, e.g., an ink jet printing process.

For example, in one example embodiment, at block 306, a photoresist material is deposited on a surface of the second support plate. The photoresist material is patterned to form a patterned photoresist material and the patterned photoresist material is developed to form the light-blocking layer. In this embodiment, the light-blocking layer is positioned over the first TFT structure and the second TFT structure to absorb light entering the electrowetting display device and prevent or limit the light from impinging on the electric components, e.g., the silicon semiconductor layer and/or one or more components of the TFT structures, positioned under or near the pixel wall portions. The light-blocking layer includes a plurality of light-blocking portions having suitable dimensions to act as a light shield to the protect silicon semiconductor layer, which is highly photosensitive, from undesirable exposure to light. In certain embodiments, a gate line is formed to operatively couple a gate driver to the first TFT structure and the second TFT structure. The gate driver is configured to activate each of the first pixel region and the second pixel region as described herein.

A first liquid and a second liquid (e.g., the oil and the electrolyte solution) can be disposed in the electrowetting pixel regions of the electrowetting display device. The second support plate is coupled to the electrowetting display device. The second support plate is positioned opposite the first support plate, forming opposing outer surfaces of the electrowetting display device. The first support plate is then coupled to the second support plate.

Figure 9:
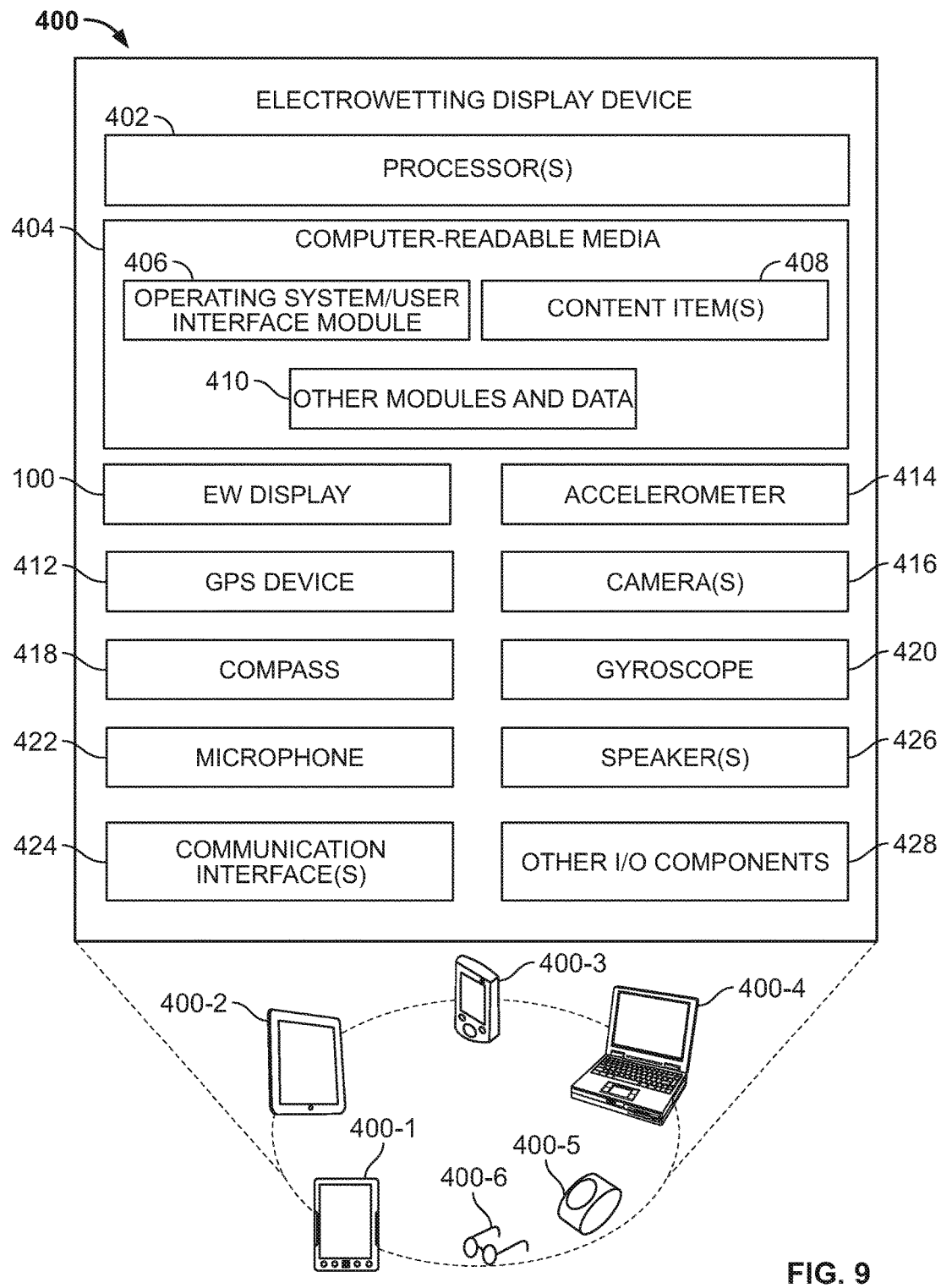
FIG. 9 illustrates an example electronic device that may incorporate an electrowetting display device, according to various embodiments.

FIG. 9 illustrates select example components of an example image display apparatus 400 that may be used with electrowetting display device 100 according to some implementations. Other types of displays may also be used with the example image display apparatus 400. Such types of displays include, but are not limited to, LCDs, cholesteric displays, electrophoretic displays, electrofluidic pixel displays, photonic ink displays, and the like.

Image display apparatus 400 may be implemented as any of a number of different types of electronic devices. Some examples of image display apparatus 400 may include digital media devices and eBook readers 400-1; tablet computing devices 400-2; smart phones, mobile devices and portable gaming systems 400-3; laptop and netbook computing devices 400-4; wearable computing devices 400-5; augmented reality devices, helmets, goggles or glasses 400-6; and any other device capable of connecting with electrowetting display device 100 and including a processor and memory for controlling the display according to the techniques described herein.

In a very basic configuration, image display apparatus 400 includes, or accesses, components such as at least one control logic circuit, central processing unit, or processor 402, and one or more computer-readable media 404. Each processor 402 may itself comprise one or more processors or processing cores. For example, processor 402 can be implemented as one or more microprocessors, microcomputers, microcontrollers, digital signal processors, central processing units, state machines, logic circuitries, and/or any devices that manipulate signals based on operational instructions. In some cases, processor 402 may be one or more hardware processors and/or logic circuits of any suitable type specifically programmed or configured to execute the algorithms and processes described herein. Processor 402 can be configured to fetch and execute computer-readable instructions stored in computer-readable media 404 or other computer-readable media. Processor 402 can perform one or more of the functions attributed to timing controller 102, source driver 104, and/or gate driver 106 of electrowetting display device 100. Processor 402 can also perform one or more functions attributed to a graphic controller (not illustrated) for the electrowetting display device.

Depending on the configuration of image display apparatus 400, computer-readable media 404 may be an example of tangible non-transitory computer storage media and may include volatile and nonvolatile memory and/or removable and non-removable media implemented in any type of technology for storage of information such as computer-readable instructions, data structures, program modules or other data. Computer-readable media 404 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, image display apparatus 400 may access external storage, such as RAID storage systems, storage arrays, network attached storage, storage area networks, cloud storage, or any other medium that can be used to store information and that can be accessed by processor 402 directly or through another computing device or network. Accordingly, computer-readable media 404 may be computer storage media able to store instructions, modules or components that may be executed by processor 402.

Computer-readable media 404 may be used to store and maintain any number of functional components that are executable by processor 402. In some implementations, these functional components comprise instructions or programs that are executable by processor 402 and that, when executed, implement operational logic for performing the actions attributed above to image display apparatus 400. Functional components of image display apparatus 400 stored in computer-readable media 404 may include the operating system and user interface module 406 for controlling and managing various functions of image display apparatus 400, and for generating one or more user interfaces on electrowetting display device 100 of image display apparatus 400.

In addition, computer-readable media 404 may also store data, data structures and the like, that are used by the functional components. For example, data stored by computer-readable media 404 may include user information and, optionally, one or more content items 408. Depending on the type of image display apparatus 400, computer-readable media 404 may also optionally include other functional components and data, such as other modules and data 410, which may include programs, drivers and so forth, and the data used by the functional components. Further, image display apparatus 400 may include many other logical, programmatic and physical components, of which those described are merely examples that are related to the discussion herein. Further, while the figures illustrate the functional components and data of image display apparatus 400 as being present on image display apparatus 400 and executed by processor 402 on image display apparatus 400, it is to be appreciated that these components and/or data may be distributed across different computing devices and locations in any manner.

FIG. 9 further illustrates examples of other components that may be included in image display apparatus 400. Such examples include various types of sensors, which may include a GPS device 412, an accelerometer 414, one or more cameras 416, a compass 418, a gyroscope 420, a microphone 422, and so forth.

Image display apparatus 400 may further include one or more communication interfaces 424, which may support both wired and wireless connection to various networks, such as cellular networks, radio, Wi-Fi networks, close-range wireless connections, near-field connections, infrared signals, local area networks, wide area networks, the Internet, and so forth. Communication interfaces 424 may further allow a user to access storage on or through another device, such as a remote computing device, a network attached storage device, cloud storage, or the like.

Image display apparatus 400 may further be equipped with one or more speakers 426 and various other input/output (I/O) components 428. Such I/O components 428 may include a touchscreen and various user controls (e.g., buttons, a joystick, a keyboard, a keypad, etc.), a haptic or tactile output device, connection ports, physical condition sensors, and so forth. For example, operating system 406 of image display apparatus 400 may include suitable drivers configured to accept input from a keypad, keyboard, or other user controls and devices included as I/O components 428. Additionally, image display apparatus 400 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device, comprising:
 a first support plate and an opposing second support plate;
 a first column of a plurality of electrowetting pixel regions between the first support plate and the second support plate, a first electrowetting pixel region in the first column comprising:
  a plurality of pixel wall portions over the first support plate, the plurality of pixel wall portions forming a perimeter of the first electrowetting pixel region; and
  a first thin film transistor (TFT) structure over the first support plate, the first TFT structure disposed adjacent a first side of a first pixel wall portion of the plurality of pixel wall portions;
 a second electrowetting pixel region in the first column, the second electrowetting pixel region adjacent the first electrowetting pixel region, the second electrowetting pixel region comprising:
  a second thin film transistor (TFT) structure over the first support plate, the second TFT structure disposed adjacent a second side of the first pixel wall portion opposite the first side; and
 a light-blocking layer disposed on an inner surface of the second support plate, the light-blocking layer comprising a first light-blocking portion positioned over the first pixel wall region, the first light-blocking portion extending over the first TFT structure and the second TFT structure.

2. The electrowetting display device of claim 1, further comprising:
an oil and an electrolyte solution that is immiscible with the oil, the oil and the electrolyte solution in the first pixel region and the second pixel region;
a gate driver; and
a gate line operatively coupling the first TFT structure and the second TFT structure to the gate driver, the gate driver transmitting a signal to each of the first pixel region and the second pixel region to activate the first pixel region and the second pixel region,
wherein with the first pixel region and the second pixel region activated, the oil within the first pixel region flows in a first direction toward the first pixel wall portion and the oil in the second pixel region flows in a second direction opposite the first direction toward the first pixel wall portion.

3. The electrowetting display device of claim 1, further comprising:
a second column of a plurality of electrowetting pixel regions between the first support plate and the second support plate adjacent the first column, a third electrowetting pixel region in the second column, the third electrowetting pixel region adjacent the first pixel region, the third electrowetting pixel region comprising:
a second plurality of pixel wall portions over the first support plate, the second plurality of pixel wall portions forming a perimeter of the third electrowetting pixel region; and
a third thin film transistor (TFT) structure over the first support plate, the third TFT structure disposed adjacent a second pixel wall portion of the second plurality of pixel wall portions, the second pixel wall portion positioned opposite a third pixel wall portion of the second plurality of pixel wall portions collinear with the first pixel wall portion,
wherein the light-blocking layer comprises a second light-blocking portion positioned over the second pixel wall portion, the second light-blocking portion extending over the third TFT structure.

4. A display device, comprising:
a first support plate and an opposing second support plate;
a first pixel region between the first support plate and the second support plate, the first pixel region comprising a first thin film transistor (TFT) structure over the first support plate;
a second pixel region between the first support plate and the second support plate and adjacent the first pixel region, the second pixel region comprising a second thin film transistor (TFT) structure over the first support plate;
a first pixel wall portion over the first support plate, the first pixel wall portion between the first pixel region and the second pixel region, wherein each of the first TFT structure and the second TFT structure is positioned adjacent the first pixel wall portion; and
a first light-blocking portion disposed on an inner surface of the second support plate, the first light-blocking portion positioned over the first TFT structure and the second TFT structure.

5. The display device of claim 4, wherein the first pixel wall portion partially forms a perimeter of the first pixel region and partially forms a perimeter of the second pixel region.

6. The display device of claim 4, further comprising a color filter layer disposed on the inner surface of the second support plate, the color filter layer comprising:
a first color filter portion associated with the first pixel region, a first segment of the first color filter portion positioned over the first pixel wall portion; and
a second color filter portion associated with the second pixel region, a second segment of the second color filter portion disposed on the first segment to form the first light-blocking portion.

7. The display device of claim 4, further comprising:
a gate driver; and
a gate line operatively coupling the first TFT structure and the second TFT structure to the gate driver, the gate driver configured to activate each of the first pixel region and the second pixel region.

8. The display device of claim 7, further comprising a first liquid and a second liquid that is immiscible with the first liquid, the first liquid and the second liquid in the first pixel region and the second pixel region, wherein the gate driver is configured to transmit a first signal through the gate line to activate the first pixel region, with the first pixel region activated, the first liquid in the first pixel region is positioned over the first TFT structure adjacent the first pixel wall portion.

9. The display device of claim 7, wherein the gate driver is configured to transmit a second signal through the gate line to activate the second pixel region, with the second pixel region activated, the first liquid in the second pixel region is positioned over the second TFT structure adjacent the first pixel wall portion.

10. The display device of claim 4, further comprising:
a source driver;
a first source line operatively coupling the first pixel region to the source driver; and
a second source line operatively coupling the second pixel region to the source driver.

11. The display device of claim 4, wherein the first pixel region and the second pixel region are arranged in a first column of a plurality of columns of pixel regions, the display device further comprising:
a third pixel region between the first support plate and the second support plate, the third pixel region positioned in a second column of the plurality of columns adjacent the first pixel region, the third pixel region comprising:
a third thin film transistor (TFT) structure over the first support plate; and
a second pixel wall portion over the first support plate, the second pixel wall portion positioned opposite a third pixel wall portion collinear with the first pixel wall portion, the second pixel wall portion and the third pixel wall portion partially forming a perimeter of the third pixel region, wherein the third TFT structure is positioned adjacent the second pixel wall portion; and
a second light-blocking portion disposed on the inner surface of the second support plate, the second light-blocking portion positioned over the third TFT structure.

12. The display device of claim 11, further comprising:
a first liquid and a second liquid that is immiscible with the first liquid, the first liquid and the second liquid disposed in the first pixel region and the third pixel region;
a gate driver;
a first gate line operatively coupling the first TFT structure to the gate driver, the gate driver configured to transmit a first signal through the first gate line to activate the first pixel region, with the first pixel region activated, the first liquid in the first pixel region moves toward the first TFT structure adjacent the first pixel wall portion; and a second gate line operatively coupling the third TFT structure to the gate driver, the gate driver configured to transmit a second signal through the second gate line to activate the third pixel region, with the third pixel region activated, the first liquid in the third pixel region moves toward the third TFT structure adjacent the second pixel wall portion.

13. The display device of claim 11, further comprising a first liquid and a second liquid that is immiscible with the first liquid, the first liquid and the second liquid disposed in the first pixel region and the third pixel region, wherein, with the first pixel region activated, a first portion of the first liquid in the first pixel region moves in a first direction toward the first TFT structure and, with the third pixel region activated, a second portion of the first liquid in the third pixel region moves in a second direction opposite the first direction toward the third TFT structure.

14. The display device of claim 11, further comprising:
a source driver; and
a source line operatively coupling the first TFT structure to the source driver and the third TFT structure to the source driver.

15. The display device of claim 11, wherein the second pixel wall is collinear with the first pixel wall, the display device further comprising:
a gate driver; and
a gate line operatively coupling the first TFT structure and the third TFT structure to the gate driver, wherein the gate driver transmits a signal through the gate line to activate each of the first pixel region and the third pixel region, with the first pixel region activated, the first liquid in the first pixel region moves toward the first TFT structure adjacent the first pixel wall portion and with the third pixel region activated, the first liquid in the third pixel region moves toward the third TFT structure adjacent the second pixel wall portion.

16. The display device of claim 15, wherein each of a first portion of the first liquid in the first pixel region and a second portion of the first liquid in the third pixel region moves in a first direction.

17. A display device, comprising:
a first support plate and an opposing second support plate;
a first pixel region between the first support plate and the second support plate and arranged in a first column of a plurality of columns of pixel regions, the first pixel region comprising:
a plurality of pixel wall portions forming a perimeter of the first pixel region;
a first thin film transistor (TFT) structure adjacent a first pixel wall portion of the plurality of pixel wall portions; and
a first light-blocking portion disposed over the first TFT structure; and
a second pixel region between the first support plate and the second support plate and arranged in a second column of the plurality of columns of pixel regions, the second pixel region positioned adjacent the first pixel region and comprising:
a second plurality of pixel wall portions forming a perimeter of the second pixel region; and
a second thin film transistor (TFT) structure adjacent a second pixel wall portion of the second plurality of pixel wall portions, the second pixel wall portion positioned opposite a third pixel wall portion of the second plurality of pixel wall portions, the third pixel wall portion collinear with the first pixel wall portion; and
a second light-blocking portion disposed over the second TFT structure.

18. The display device of claim 17, further comprising:
a gate driver;
a first gate line operatively coupling the first TFT structure to the gate driver, the gate driver configured to transmit a first signal through the first gate line to activate the first pixel region; and
a second gate line operatively coupling the second TFT structure to the gate driver, the gate driver configured to transmit a second signal through the second gate line to activate the second pixel region.

19. The display device of claim 17, further comprising a third pixel region between the first support plate and the second support plate and arranged in the first column adjacent the first pixel region, the third pixel region comprising a third thin film transistor (TFT) structure adjacent the first pixel wall portion, wherein the first light-blocking portion is disposed over the third TFT structure.

20. The display device of claim 19, further comprising:
a gate driver; and
a gate line operatively coupling the first TFT structure and the third TFT structure to the gate driver, wherein the gate driver is configured to transmit a signal through the gate line to activate each of the first pixel region and the third pixel region.

* * * * *